US012664443B2

(12) United States Patent
Li et al.

(10) Patent No.: US 12,664,443 B2
(45) Date of Patent: Jun. 23, 2026

(54) EVENT PREDICTION METHOD BASED ON SATELLITE ORBIT THREAT DOMAIN KNOWLEDGE GRAPH

(71) Applicant: ZHEJIANG LAB, Hangzhou (CN)

(72) Inventors: Yuehua Li, Hangzhou (CN); Fei Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 19/275,890

(22) Filed: Jul. 21, 2025

(65) Prior Publication Data

US 2026/0037835 A1 Feb. 5, 2026

(30) Foreign Application Priority Data

Aug. 1, 2024 (CN) .......................... 202411051948.X

(51) Int. Cl.
G06N 5/02 (2023.01)

(52) U.S. Cl.
CPC ...................................... G06N 5/02 (2013.01)

(58) Field of Classification Search
CPC ....................................................... G06N 5/02
See application file for complete search history.

(56) References Cited

FOREIGN PATENT DOCUMENTS

| CN | 113822494 A | 12/2021 |
| CN | 116402137 A | 7/2023 |
| CN | 117240632 A | 12/2023 |
| CN | 118260717 A | 6/2024 |
| WO | 2023065545 A1 | 4/2023 |
| WO | 2024138803 A1 | 7/2024 |

OTHER PUBLICATIONS

Zhong, Lingfeng, et al. "A comprehensive survey on automatic knowledge graph construction." ACM Computing Surveys 56.4 (2023): 1-62. (Year: 2023).*

Noori, Ayush, et al. "Metapaths: similarity search in heterogeneous knowledge graphs via meta-paths." Bioinformatics 39.5 (2023): btad297. (Year: 2023).*

Yu, Beibei, et al. "Meta-path and hypergraph fused distillation framework for heterogeneous information networks embedding." Information Sciences 667 (2024): 120453. (Year: 2024).*

Le May, Samantha. Graph databases to support space situational awareness and space traffic management. Diss. RMIT University, 2024. (first published 2021) (Year: 2021).*

Zhang, An-li et al. "Threat Assessment of High-orbit Early Warning Satellites Based on Aggregation Model", Command Control & Simulation vol. 38 No. 2, Apr. 15, 2016, 6 pages.

China National Intellectual Property Administration, Notice of Allowance Issued in Chinese Application No. 202411051948.X, Sep. 14, 2024, which is a foreign counterpart application to this application, to which this application claims priority.

* cited by examiner

*Primary Examiner* — Kevin W Figueroa
(74) *Attorney, Agent, or Firm* — BSJ & SUN LLC

(57) ABSTRACT

An event prediction method based on a satellite orbit threat domain knowledge graph is provided. By constructing a knowledge graph of the satellite orbit threat domain, and utilizing steps such as meta-path extraction, hyperedge construction, feature encoding, and feature aggregation, target features that can comprehensively and accurately describe each entity and the complex relationships between each entity in the satellite orbit threat domain are obtained, and a prediction model is trained by using the target features of each entity.

18 Claims, 5 Drawing Sheets

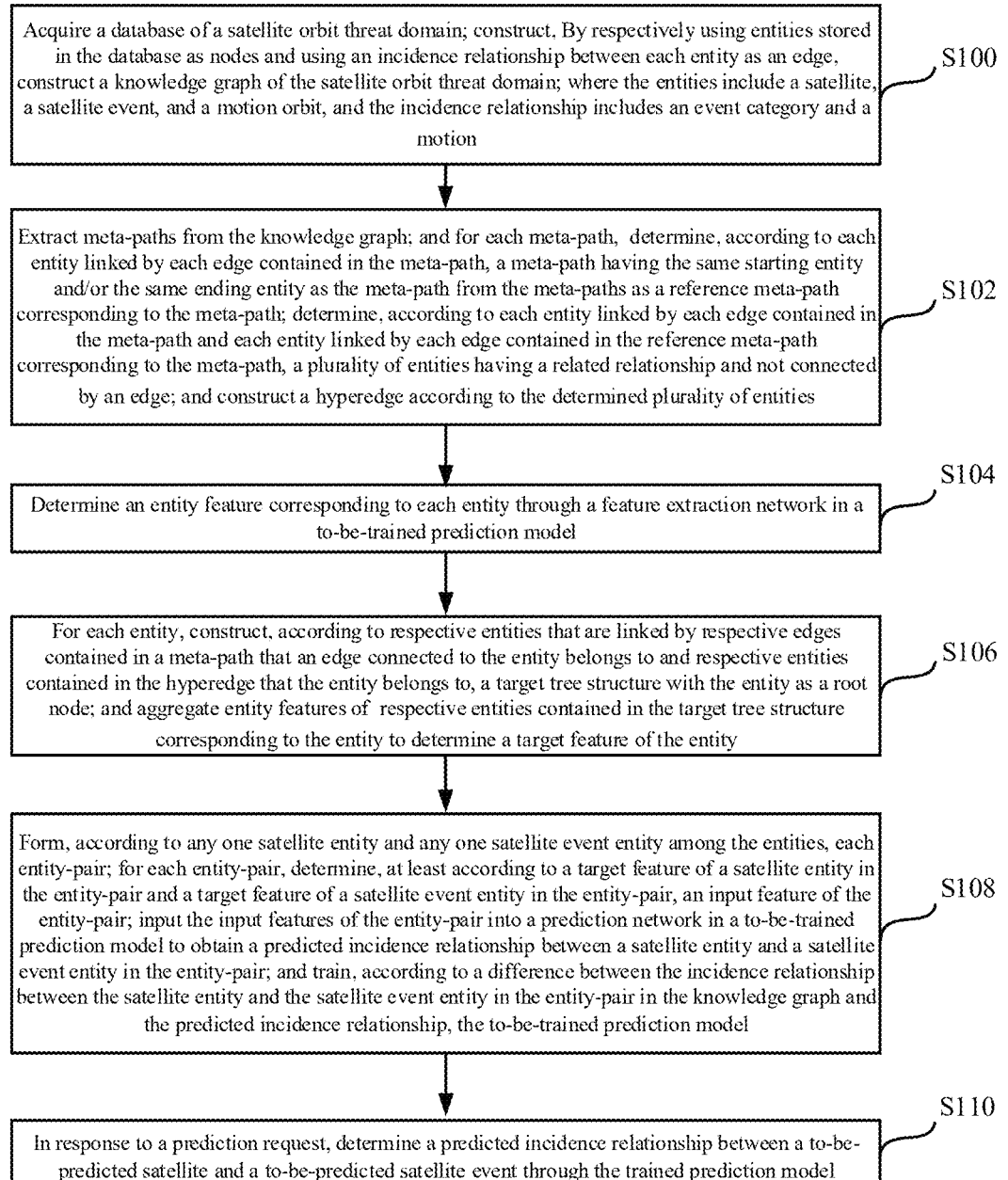

Acquire a database of a satellite orbit threat domain; construct, By respectively using entities stored in the database as nodes and using an incidence relationship between each entity as an edge, construct a knowledge graph of the satellite orbit threat domain; where the entities include a satellite, a satellite event, and a motion orbit, and the incidence relationship includes an event category and a motion — S100

Extract meta-paths from the knowledge graph; and for each meta-path, determine, according to each entity linked by each edge contained in the meta-path, a meta-path having the same starting entity and/or the same ending entity as the meta-path from the meta-paths as a reference meta-path corresponding to the meta-path; determine, according to each entity linked by each edge contained in the meta-path and each entity linked by each edge contained in the reference meta-path corresponding to the meta-path, a plurality of entities having a related relationship and not connected by an edge; and construct a hyperedge according to the determined plurality of entities — S102

Determine an entity feature corresponding to each entity through a feature extraction network in a to-be-trained prediction model — S104

For each entity, construct, according to respective entities that are linked by respective edges contained in a meta-path that an edge connected to the entity belongs to and respective entities contained in the hyperedge that the entity belongs to, a target tree structure with the entity as a root node; and aggregate entity features of respective entities contained in the target tree structure corresponding to the entity to determine a target feature of the entity — S106

Form, according to any one satellite entity and any one satellite event entity among the entities, each entity-pair; for each entity-pair, determine, at least according to a target feature of a satellite entity in the entity-pair and a target feature of a satellite event entity in the entity-pair, an input feature of the entity-pair; input the input features of the entity-pair into a prediction network in a to-be-trained prediction model to obtain a predicted incidence relationship between a satellite entity and a satellite event entity in the entity-pair; and train, according to a difference between the incidence relationship between the satellite entity and the satellite event entity in the entity-pair in the knowledge graph and the predicted incidence relationship, the to-be-trained prediction model — S108

In response to a prediction request, determine a predicted incidence relationship between a to-be-predicted satellite and a to-be-predicted satellite event through the trained prediction model — S110

FIG. 1

EVENT PREDICTION METHOD BASED ON SATELLITE ORBIT THREAT DOMAIN KNOWLEDGE GRAPH

CROSS-REFERENCE TO RELATED APPLICATIONS

The present disclosure claims priority to the Chinese Patent Application No. 202411051948.X, filed with the Chinese Patent Office on Aug. 1, 2024, which is incorporated herein by reference in its entirety.

TECHNICAL FIELD

The present disclosure relates to the field of computer technologies, and in particular, to an event prediction method based on a satellite orbit threat domain knowledge graph.

BACKGROUND

In the satellite orbit threat domain, the occurrence of a close approach event of a satellite may cause a significant impact, including a satellite collision or other unpredictable situations, highlighting the importance of the close approach event. However, conventional prediction methods often fail to effectively capture the features of these events, largely because conventional prediction methods do not take into account dynamic relationships and complex environmental changes.

SUMMARY

The present disclosure provides an event prediction method based on a satellite orbit threat domain knowledge graph, including:

acquiring a database of a satellite orbit threat domain; by respectively using entities stored in the database as nodes and using an incidence relationship between each entity as an edge, constructing a knowledge graph of the satellite orbit threat domain; where the entities include a satellite, a satellite event, and a motion orbit, and the incidence relationship includes an event category and a motion state;

extracting meta-paths from the knowledge graph; and for each of the meta-paths, determining, according to each entity linked by each edge contained in the meta-path, a meta-path having a same starting entity and/or a same ending entity as the meta-path from the meta-paths as a reference meta-path corresponding to the meta-path; determining, according to each entity linked by each edge contained in the meta-path and each entity linked by each edge contained in the reference meta-path corresponding to the meta-path, a plurality of entities having a related relationship and not connected by an edge; and constructing, according to the determined plurality of entities, a hyperedge;

determining an entity feature corresponding to each entity through a feature extraction network in a to-be-trained prediction model;

for each entity, constructing, according to respective entities that are linked by respective edges contained in a meta-path that an edge connected to the entity belongs to and respective entities contained in the hyperedge that the entity belongs to, a target tree structure with the entity as a root node; aggregating entity features of respective entities contained in the target tree structure corresponding to the entity to determine a target feature of the entity;

forming, according to any one satellite entity and any one satellite event entity in the entities, an entity-pair; determining, for each entity-pair, at least according to a target feature of a satellite entity in the entity-pair and a target feature of a satellite event entity in the entity-pair, an input feature of the entity-pair; obtaining, by inputting the input feature of the entity-pair into a prediction network in a to-be-trained prediction model, a predicted incidence relationship between the satellite entity and the satellite event entity in the entity-pair; and training, according to a difference between the incidence relationship between the satellite entity and the satellite event entity in the entity-pair in the knowledge graph and the predicted incidence relationship, the to-be-trained prediction model; and in response to a prediction request, determining a predicted incidence relationship between a to-be-predicted satellite and a to-be-predicted satellite event through the trained prediction model.

In some embodiments, determining, according to each entity linked by each edge contained in the meta-path and each entity linked by each edge contained in the reference meta-path corresponding to the meta-path, the plurality of entities having the related relationship and not connected by the edge, includes:

determining an incidence relationship type corresponding to each edge contained in the meta-path;

determining an incidence relationship type corresponding to each edge contained in the reference meta-path corresponding to the meta-path;

by using an intersection entity between the meta-path and a reference meta-path of the meta-path as a starting point, sequentially determining whether the incidence relationship type corresponding to each edge contained in the meta-path is same as the incidence relationship type corresponding to each edge contained in the reference meta-path corresponding to the meta-path, and obtaining a determination result between each edge contained in the meta-path and each edge contained in the reference meta-path corresponding to the meta-path, until the determination result indicates that the incidence relationship types are different or edges contained in the meta-path are traversed; and determining an entity linked by an edge contained in the meta-path and an entity linked by an edge contained in the reference meta-path corresponding to the meta-path, that have a determination result that the incidence relationship types are the same, as the plurality of entities having the related relationship and not connected by the edge.

In some embodiments, determining the entity feature corresponding to each entity through the feature extraction network in the to-be-trained prediction model, includes:

for each entity, obtaining, by inputting the entity into the feature extraction network in the to-be-trained prediction model, an initialization feature of the entity output by the feature extraction network;

determining, according to the initialization feature of the entity and the initialization features of respective entities contained in the hyperedge that the entity belongs to, a weight corresponding to the entity through an attention network in the to-be-trained prediction model; and obtaining, by weighting the initialization feature of the entity with the weight corresponding to the entity, the entity feature corresponding to the entity.

In some embodiments, constructing, according to each entity that is linked by each edge contained in the meta-path that an edge connected to the entity belongs to and each entity contained in the hyperedge that the entity belongs to, the target tree structure with the entity as the root node, includes:

using the entity as the root node, and using other entities, other than the entity, contained in the hyperedge that the entity belongs to as respective first child nodes of the root node;

determining, among each entity that is linked by each edge contained in a meta-path that an edge connected to the entity belongs to, entities that are directly connected to the entity through edges as second child nodes of the root node; and for each second child node, using the second child node as a current child node; determining, according to an edge linking the current child node in a meta-path that an edge connected to the entity belongs to, next-level child nodes corresponding to the current child node; for each next-level child node, by using the next-level child node as a current child node, re-determining next-level child nodes corresponding to the current child node, until entities that are linked by edges contained in the meta-path that the edge connected to the entity belongs to are traversed; and obtaining the target tree structure corresponding to the entity, with the entity as the root node, containing first child nodes, second child nodes, and respective levels of child nodes corresponding to each second child node.

In some embodiments, aggregating entity features of respective entities contained in the target tree structure corresponding to the entity to determine the target feature of the entity, includes:

by using each parent node directly connected to each leaf node in the target tree structure corresponding to the entity as a starting point of a feature aggregation, sequentially determining each current to-be-aggregated node;

for each current to-be-aggregated node, in the target tree structure corresponding to the entity, determining each child node directly connected to the current to-be-aggregated node, and acquiring a current feature of each child node directly connected to the current to-be-aggregated node obtained by a previous feature aggregation;

obtaining, by aggregating the current feature corresponding to each child node directly connected to the current to-be-aggregated node and an entity feature of the current to-be-aggregated node through a gated recurrent unit, a current feature of the current to-be-aggregated node;

by using a parent node directly connected to each current to-be-aggregated node as a current to-be-aggregated node for a next feature aggregation, re-performing a feature aggregation, until obtaining a current feature of the root node in the target tree structure corresponding to the entity; and using the current feature of the root node in the target tree structure corresponding to the entity as the target feature of the entity;

where, in response to determining that each child node directly connected to the current to-be-aggregated node is a leaf node in the target tree structure corresponding to the entity, a current feature of each child node directly connected to the current to-be-aggregated node is an entity feature of each child node directly connected to the current to-be-aggregated node.

In some embodiments, determining, for each entity-pair, at least according to the target feature of the satellite entity in the entity-pair and the target feature of the satellite event entity in the entity-pair, the input feature of the entity-pair, includes:

for each entity-pair, in the knowledge graph, in response to determining that the satellite entity in the entity-pair and the satellite event entity in the entity-pair are connected by an edge, determining, according to the entity feature of the satellite entity in the entity-pair and the entity feature of the satellite event entity in the entity-pair, a first gating weight and a second gating weight through a self-gating layer in the to-be-trained prediction model;

weighting the entity feature of the satellite entity in the entity-pair with the first gating weight, weighting the entity feature of the satellite event entity in the entity-pair with the second gating weight, and determining, according to a weighted entity feature of the satellite entity and a weighted entity feature of the satellite event entity, an edge feature corresponding to the edge between the satellite entity in the entity-pair and the satellite event entity in the entity-pair; and obtaining, by splicing the target feature of the satellite entity in the entity-pair, the target feature of the satellite event entity in the entity-pair, and the edge feature corresponding to the edge between the satellite entity in the entity-pair and the satellite event entity in the entity-pair, the input feature of the entity-pair.

In some embodiments, a predicted incidence relationship between the satellite entity and the satellite event entity output by the prediction network is represented by a predicted probability that the incidence relationship exists between the satellite entity and the satellite event entity; and training, according to a difference between the incidence relationship between the satellite entity and the satellite event entity in the entity-pair in the knowledge graph and the predicted incidence relationship, the to-be-trained prediction model specifically includes:

according to the incidence relationship between the satellite entity and the satellite event entity in the entity-pair in the knowledge graph, using an entity-pair with an edge between the satellite entity and the satellite event entity as a positive sample pair, and using an entity-pair with no edge between the satellite entity and the satellite event entity as a negative sample pair;

determining, according to a first predicted probability of an incidence relationship existence between a satellite entity and a satellite event entity in the positive sample pair and a second predicted probability of an incidence relationship existence between a satellite entity and a satellite event entity in the negative sample pair, a loss function; where the loss function is inversely proportional to the first predicted probability, and the loss function is directly proportional to the second predicted probability; and training the to-be-trained prediction model with minimization of the loss function as a training goal.

In some embodiments, determining the predicted incidence relationship between the to-be-predicted satellite and the to-be-predicted satellite event through the trained prediction model, includes:

obtaining attribute information of the to-be-predicted satellite and attribute information of the to-be-predicted satellite event; determining, according to the attribute information of the to-be-predicted satellite and the attribute information of the to-be-predicted satellite event, in the knowledge graph, a first node corresponding to the to-be-predicted satellite and a second node corresponding to the to-be-predicted satellite event; and in the knowledge graph, establishing an edge between the first node and another node having an incidence relationship with the first node, and establishing an edge between the second node and another node having an incidence relationship with the second node; and according to the first node, the second node, the edge connected to the first node, and the edge connected to the second node, updating the knowledge graph; and extracting a meta-path linking the first node and a meta-path linking the second node from the updated knowledge graph;

determining, according to each entity in the meta-path linking the first node, a plurality of entities having a related relationship and not connected by an edge with the first node, and constructing, according to the determined plurality of entities, a first hyperedge containing the first node;

determining, according to each entity in a meta-path linking the second node, a plurality of entities having a related relationship and not connected by an edge with the second node, and constructing, according to the determined plurality of entities, a second hyperedge containing the second node;

constructing, according to the meta-path linking the first node and the first hyperedge, a tree structure with the first node as a root node, and determining, through a feature extraction network in the trained prediction model and the tree structure corresponding to the first node, a target feature of the first node;

constructing, according to the meta-path linking the second node and the second hyperedge, a tree structure with the second node as a root node, and determining, through a feature extraction network in the trained prediction model and the tree structure corresponding to the second node, a target feature of the second node; and determining, according to the target feature of the first node and the target feature of the second node, an input feature, and inputting the input feature into a prediction network in the trained prediction model to obtain a predicted incidence relationship between the to-be-predicted satellite entity and the to-be-predicted satellite event entity.

The present disclosure provides an event prediction apparatus based on a satellite orbit threat domain knowledge graph, including:

a knowledge graph construction module, configured to: acquire a database of a satellite orbit threat domain; by respectively using entities stored in the database as nodes and using an incidence relationship between each entity as an edge; construct a knowledge graph of the satellite orbit threat domain; where the entities include a satellite, a satellite event, and a motion orbit, and the incidence relationship includes an event category and a motion state;

a hyperedge construction module, configured to: extract meta-paths from the knowledge graph; and for each of the meta-paths, determine, according to each entity linked by each edge contained in the meta-path, a meta-path having a same starting entity and/or a same ending entity as the meta-path from the meta-paths as a reference meta-path corresponding to the meta-path; determine, according to each entity linked by each edge contained in the meta-path and each entity linked by each edge contained in the reference meta-path corresponding to the meta-path, a plurality of entities having a related relationship and not connected by an edge; and construct, according to the determined plurality of entities, a hyperedge.

an entity feature determining module, configured to: determine an entity feature corresponding to each entity through a feature extraction network in a to-be-trained prediction model;

a target feature determining module, configured to: for each entity, construct, according to respective entities that are linked by respective edges contained in a meta-path that an edge connected to the entity belongs to and respective entities contained in the hyperedge that the entity belongs to, a target tree structure with the entity as a root node; aggregate entity features of respective entities contained in the target tree structure corresponding to the entity to determine a target feature of the entity;

a training module, configured to: form, according to any one satellite entity and any one satellite event entity in the entities, an entity-pair; determine, for each entity-pair, at least according to a target feature of a satellite entity in the entity-pair and a target feature of a satellite event entity in the entity-pair, an input feature of the entity-pair; obtain, by inputting the input feature of the entity-pair into a prediction network in a to-be-trained prediction model, a predicted incidence relationship between the satellite entity and the satellite event entity in the entity-pair; and train, according to a difference between the incidence relationship between the satellite entity and the satellite event entity in the entity-pair in the knowledge graph and the predicted incidence relationship, the to-be-trained prediction model; and a prediction module, configured to: in response to a prediction request, determine a predicted incidence relationship between a to-be-predicted satellite and a to-be-predicted satellite event through the trained prediction model.

The present disclosure provides a computer-readable storage medium, where the storage medium stores a computer program, and the computer program, when executed by one or more processors, implements the foregoing event prediction method based on a satellite orbit threat domain knowledge graph.

The present disclosure provides an electronic device, including a memory, one or more processors, and a computer program stored in the memory and executable on the one or more processors, where the one or more processors, when executing the program, implements the foregoing event prediction method based on a satellite orbit threat domain knowledge graph.

The above at least one technical scheme used in the present disclosure can achieve the following beneficial effects:

In the event prediction method based on a satellite orbit threat domain knowledge graph provided by the present disclosure, by constructing a knowledge graph of the satellite orbit threat domain, and utilizing steps such as meta-path extraction, hyperedge construction, feature encoding, and feature aggregation, target features that can comprehensively and accurately describe each entity and the complex relationships between each entity in the satellite orbit threat domain are obtained, and a prediction model is trained by using the target feature of each entity, such that the prediction model has a capability of accurately determining an association between a satellite and a satellite event, thereby improving the efficiency and accuracy of satellite event prediction. Compared with a conventional knowledge graph scheme, in the foregoing scheme, in a training process of the prediction model, strengthening the understanding of entity associations effectively improves accuracy and efficiency of event prediction in the satellite orbit threat domain by the prediction model, and provides more reliable support for decision-making and response in the domain.

BRIEF DESCRIPTION OF DRAWINGS

The accompanying drawings described herein are used to provide a further understanding of the present disclosure and constitute a part of the present disclosure, and the schematic embodiments of the present disclosure and the description thereof are used to explain the present disclosure and do not constitute improper limitations to the present disclosure. In the drawings:

FIG. 1 is a flow diagram of an event prediction method based on a satellite orbit threat domain knowledge graph according to the present disclosure;

DETAILED DESCRIPTION

Figure 2:
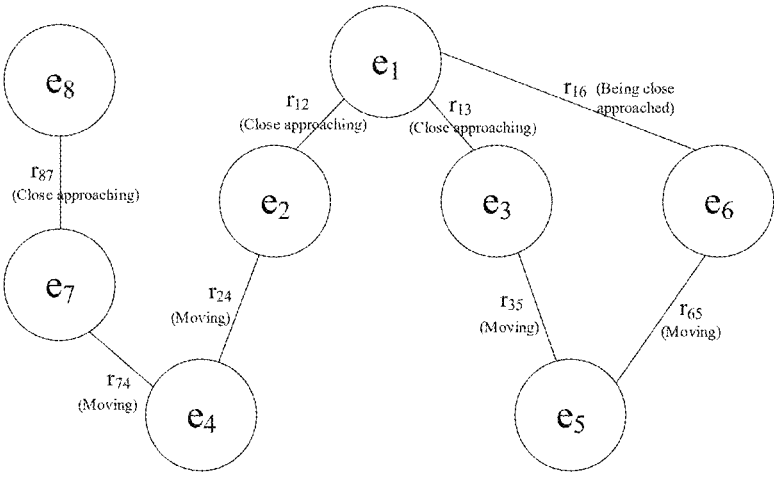
FIG. 2 is a partial diagram based on a knowledge graph of the satellite orbit threat domain according to the present disclosure.

To make the objectives, technical schemes, and advantages of the present disclosure clearer, the following clearly and completely describes the technical schemes of the present disclosure with reference to specific embodiments of the present disclosure and corresponding accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In addition, it should be noted that all actions of acquiring signals, information, or data in the present disclosure are performed on the premise of complying with a corresponding data protection regulation policy of a location and being authorized by a corresponding device owner.

It should be noted that, the features in the following embodiments and embodiments may be combined with each other without conflict.

With the increase of space activity, the satellite orbit threat domain has received widespread attention. Normally, satellites and spacecraft may move along a predetermined orbit to achieve their corresponding functions, such as communication, meteorological observation, navigation and positioning, etc. However, due to the increase of the number of satellites, the distance between two artificial satellites in orbit or the distance between one satellite and a space object such as a space debris is abnormally close. Since there is no air resistance in the space environment to slow down the speed, even a very small relative speed, if two satellites are close enough, it may cause collision, cause damage to expensive satellites and spacecraft, and even generate more space fragments, further exacerbating the danger of the space environment.

Generally, the event of abnormal close approach between a satellite and another satellite or between a satellite and a piece of space debris becomes a satellite close approach event, and such event usually needs to be closely monitored and managed, so as to ensure the safety of the space task. When a potential satellite close approach event is predicted, the ground control team may direct the satellites to perform orbital maneuvers, such as adjusting speed or changing orbit altitude, to avoid a collision. Therefore, improving prediction accuracy of the satellite close approach event is particularly important to ensure satellite safety.

Currently, a combination of a machine learning model and a knowledge graph is usually used to predict a satellite close approach event. However, the traditional knowledge graph has some limitations in event prediction, and the main problem is that the traditional knowledge graph has insufficient modeling for dynamic relationships and complex relationships. Traditional knowledge graphs often simplify the relationship between entities into a static connection, which cannot reflect the dynamic change of the relationship between each entity and cannot comprehensively and accurately describe the complex relationship between each entity, thereby reducing the accuracy of event prediction.

Based on this, the present disclosure provides an event prediction method based on a satellite orbit threat domain knowledge graph, by introducing a meta-path and a hyper-edge into a traditional knowledge graph and combining schemes of feature encoding and feature aggregation, which comprehensively and accurately understands and describes a complex relationship between each entity in the satellite orbit threat domain, so as to improve the accuracy of event prediction.

The technical schemes provided in the embodiments of the present disclosure are described in detail below with reference to the accompanying drawings.

FIG. 1 is a flow diagram of an event prediction method based on a satellite orbit threat domain knowledge graph according to the present disclosure.

S100: a database of a satellite orbit threat domain is acquired; by respectively using entities stored in the database as nodes and using an incidence relationship between each entity as an edge, a knowledge graph of the satellite orbit threat domain is constructed; and the entities include a satellite, a satellite event, and a motion orbit, and the incidence relationship includes an event category and a motion state.

In the event prediction method based on a satellite orbit threat domain knowledge graph provided in the embodiments of the present disclosure, an execution process of the method may be performed by an electronic device such as a server deployed with a prediction model for predicting an event in the satellite orbit threat domain. In addition, in the process of executing the method, for the involved trained prediction model, the electronic device executing the model training process of the prediction model and the electronic device executing the method may be the same or different, which is not limited in the present disclosure.

Specifically, a database of a specific domain such as the satellite orbit threat domain is obtained, the database may store pre-extracted each entity in the satellite orbit threat domain and incidence relationships between each entity, and may be stored in a form of a triplet, e.g., represented as a triplet set $D=\{(e_i, r_j, e_k)\}$, $e_i$ is the head entity and $e_k$ is the tail entity in the triplet, and $r_j$ is used to represent an incidence relationship between the head entity and tail entity.

The entities may include a satellite, a satellite event, and a motion orbit, and the incidence relationship may be an event category and a motion state, when the satellite event is a close approach event, the incidence relationship of the event category may further be subdivided into two event types: close approaching and being close approached. The motion state includes moving and non-moving, generally, when a satellite has been or is moving along a certain motion orbit, the incidence relationship between the satellite entity and the motion orbit entity is defined as moving, and for a motion state as non-moving, no edge may be constructed in the knowledge graph.

For example, in the partial graph structure of the knowledge graph shown in FIG. 2, entity $e_1$ corresponds to the satellite event A, and entity $e_2$ corresponds to the satellite B, then triplet $(e_1, r_{12}, e_2)$ represents that the satellite event A has occurred on the satellite B, and when the event corresponding to $e_1$ is a close approach event and the incidence relationship represented by $r_{12}$ is specifically close approach, then triplet $(e_1, r_{12}, e_2)$ represents that the satellite event A has occurred on the satellite B, and the satellite B is a party that is in a close approach to another satellite or object. Entity $e_4$ corresponds to the motion orbit C, and triplet $(e_2, r_{24}, e_4)$ indicates that the satellite B moved along the motion orbit C.

In addition, each edge contained in the knowledge graph may be an undirected edge or a directed edge, and when each edge in the knowledge graph is a directed edge, a direction of the edge may be determined according to a type of an incidence relationship corresponding to each edge, for example, in the graph structure shown in FIG. 2, edge $r_{12}$ represents an incidence relationship of close approach, so the direction of edge $r_{12}$ may be from entity $e_1$ to entity $e_2$. Certainly, the foregoing scheme of determining the direction of the directed edge according to the close approach incidence relationship is merely an optional example provided in the present disclosure, and in practice, the specific scheme of determining the direction of the directed edge may be adjusted according to specific application scenarios and requirements, which is not limited in the present disclosure.

In the present disclosure, in the constructed knowledge graph of the satellite orbit threat domain, each satellite entity may have an incidence relationship with one or more satellite events, and the incidence relationship is an event category, e.g., close approaching or being close approached. Each satellite entity may further have an incidence relationship with one or more motion orbit entities, and the incidence relationship is a motion state.

Certainly, if the acquired database of the satellite orbit threat domain contains original data without entity and relationship extraction, any existing type of extraction schemes such as an entity and relationship extraction tool or an entity recognition model may be used to extract each entity of the satellite orbit threat domain from the original data, e.g., represented as $E=\{e_1, e_2, \ldots, e_m\}$, and determine an incidence relationship between each entity, e.g., represented as $R=\{r_1, r_2, \ldots, r_n\}$. Then, each triplet $D=\{(e_i, r_j, e_k)\}$ is constructed based on each entity and the incidence relationship between each entity.

In addition, the knowledge graph in the satellite orbit threat domain in the present disclosure may be a dynamic graph, i.e., the knowledge graph may be periodically updated as entities and incidence relationships in a database in the satellite orbit threat domain increase, delete, or update, such that the event prediction method provided in the present disclosure can adapt to a latest relationship between each entity, thereby improving prediction accuracy.

S102: meta-paths are extracted from the knowledge graph; and for each meta-path, according to each entity linked by each edge contained in the meta-path, a meta-path having the same starting entity and/or the same ending entity as the meta-path is determined from the meta-paths as a reference meta-path corresponding to the meta-path; according to each entity linked by each edge contained in the meta-path and each entity linked by each edge contained in the reference meta-path corresponding to the meta-path, a plurality of entities having a related relationship and not connected by an edge are determined, and a hyperedge is constructed according to the determined plurality of entities.

In the present disclosure, meta-paths are extracted from a knowledge graph, and a hyperedge is constructed based on the meta-paths, each entity that is not originally connected by an edge in the knowledge graph is linked by a hyperedge, potential related relationship between each entity is found, and the potential related relationship between each entity represented by the hyperedge is combined with the related relationship between each entity represented by the edges in the knowledge graph, a complex relationship between each entity in the satellite orbit threat domain is modeled, thereby training a prediction model based on modeling of such complex relationships, to improve accuracy and efficiency of event prediction.

Thus, a meta-path is first extracted from the knowledge graph. In the present disclosure, a meta-path is an edge sequence constructed by one or more edges, and types of incidence relationships corresponding to edges contained in a meta-path may be same, different, partially same, or partially different, which is not limited in the present disclosure. A method of extracting the meta-paths from the knowledge graph may be: selecting an entity from the knowledge graph as a starting point, using an edge directly connected to the entity as the first edge contained in the meta-path, determining the next entity according to the edge contained in the meta-path, and then determining a next edge contained in the meta-path, and repeating iteration for a plurality of times until a preset condition is met, e.g., the preset condition is that the meta-path includes a preset quantity of edges, or a next edge cannot be found in the knowledge graph.

For example, still using FIG. 2 as an example, a meta-path is extracted by using entity $e_1$ as a starting point, edges directly connected to entity $e_1$ include $r_{12}$, $r_{13}$ and $r_{16}$, the three edges are placed into three meta-paths respectively, and allocated as a first edge in the three meta-paths, that is, $p_1=(r_{12})$, $p_2=(r_{13})$, $p_3=(r_{16})$; for meta-path $p_1$, according to the first edge $r_{12}$ contained in meta-path $p_1$, another entity $e_2$ connected to the edge is determined, and an edge $r_{24}$ directly connected to entity $e_2$ is used as a second edge contained in meta-path $p_1$, i.e., $p_1=(r_{12}, r_{24})$. Then, it is determined that the next entity is $e_4$ according to the edge $r_{24}$ in $p_1$, but entity $e_4$ has no other directly connected edge except $r_{24}$, therefore the preset condition that the next edge cannot be found in the knowledge graph is met, so meta-path $p_1=(r_{12}, r_{24})$ is extracted. Based on the same meta-path extraction scheme, the extracted meta-paths are $p_2=(r_{13}, r_{35})$ and $p_3=(r_{16}, r_{65})$.

It should be noted that, in one or more embodiments of the present disclosure, the number of edges contained in each meta-path extracted from the knowledge graph may be the same or different.

Then, a hyperedge is constructed based on each meta-path. In the present disclosure, a hyperedge links a plurality of entities that are not connected by an edge in the knowledge graph but have a related relationship. In the knowledge graph of the satellite orbit threat domain, that two entities are not connected by an edge can only indicate that an incidence relationship of an event category or of a motion state does not exist between the two entities. For example, there is no edge between a satellite entity and a satellite event entity, indicating that the satellite event has not occurred on the satellite. For another example, there is no edge between a satellite entity and a motion orbit entity, indicating that the satellite did not move along the motion orbit. However, this does not indicate that there is no other deeper and more complex related relationship between two entities that are not connected by an edge. Still using FIG. 2 as an example, entity $e_2$ and entity $e_3$ are not directly connected by an edge, but both entity $e_2$ and entity $e_3$ are directly connected to entity $e_1$ through an edge respectively, the edge between entity $e_2$ and entity $e_1$ is an edge of a close approach type, and the edge between entity $e_3$ and entity $e_1$ is also an edge of a close approach type, which indicates that the satellite event corresponding to $e_1$ occurred both on the satellite corresponding to entity $e_2$ and the satellite corresponding to entity $e_3$, which both are a party that is approaching in a close approach event, and although entity $e_2$ and entity $e_3$ are not directly connected by an edge in the knowledge graph, the two are both substantially related. The hyperedge constructed in the present disclosure is intended to model this related relationship.

Based on this, a specific implementation of constructing a hyperedge based on each meta-path in the present disclosure is described below.

The first step: from respective meta-paths, for each meta-path, according to each entity linked by each edge contained in the meta-path, a meta-path having the same starting entity and/or the same ending entity as the meta-path is determined as a reference meta-path corresponding to the meta-path.

As described above, the hyperedge is intended to model a related relationship that is not represented by an edge between each entity in the knowledge graph. In the present disclosure, by searching whether two entities that are not directly connected by using an edge have an incidence relationship with the same entity, whether a related relationship exists between the two entities that are not directly connected by an edge is determined. Therefore, for each meta-path, according to each entity on the meta-path and each entity on meta-paths other than the meta-path among respective meta-paths, a meta-path having the same starting entity and/or the same ending entity as the meta-path is determined as a reference meta-path corresponding to the meta-path. That is, for a meta-path, the meta-path and its corresponding reference meta-path have the same starting entity, or have the same ending entity, or have the same starting entity and the same ending entity.

For example, as shown in FIG. 2, for meta-path $p_1=(r_{12}, r_{24})$, each entity linked by each edge contained in meta-path $p_1=(r_{12}, r_{24})$ is sequentially $e_1$, $e_2$ and $e_4$, and for meta-path $p_2=(r_{13}, r_{35})$, each entity linked by each edge contained in meta-path $p_2=(r_{13}, r_{35})$ is sequentially $e_1$, $e_3$, and $e_5$. It can be learned that, meta-path $p_1$ and meta-path $p_2$ have the same starting entity $e_1$, and therefore the reference meta-path of $p_1$ may be $p_2$. Then, although entity $e_2$ linked by the edge contained in $p_1$ and entity $e_3$ linked by the edge contained in $p_2$ are not directly connected by an edge, both of them are directly connected to entity $e_1$, so actually, there is a related relationship between the two entities. Specifically, in the satellite orbit threat domain, entity $e_2$ and entity $e_3$ represent the satellite B and the satellite C respectively, based on an edge between entity $e_2$ and entity $e_1$, and an edge between entity $e_3$ and entity $e_1$, which actually indicates that a satellite event A occurred on both the satellite B and the satellite C, so it may be considered that the satellite B and the satellite C have a common and related relationship in some aspects, e.g., the satellite B and the satellite C have a similarity in satellite design and structure, or move in a similar external space environment, or perform a similar task, etc. Thus, entity $e_2$ corresponding to the satellite B and entity $e_3$ corresponding to the satellite C are actually two entities that are not connected by an edge but have a related relationship, and a hyperedge may be constructed based on the two entities.

Based on the same scheme of determining the reference meta-path, in FIG. 2, meta-path $p_1=(r_{12}, r_{24})$ and meta-path $p_4=(r_{87}, r_{74})$ have the same ending entity $e_4$, then $p_4$ may be used as the reference meta-path of $p_1$. Meta-path $p_2=(r_{13}, r_{35})$ and meta-path $p_3=(r_{16}, r_{65})$ have the same starting entity $e_1$ and the same ending entity $e_5$, $p_3$ may be used as a reference meta-path of $p_2$.

The second step: a plurality of entities that have a related relationship and are not connected by an edge are determined according to each entity linked by each edge contained in the meta-path and each entity linked by each edge contained in the reference meta-path corresponding to the meta-path, and a hyperedge is constructed according to the determined plurality of entities.

Further, after the reference meta-path of the meta-path is determined, by using the intersection entity (the same entity) between the meta-path and the reference meta-path of the meta-path as a starting point, each entity other than the intersection entity linked by each edge contained in the meta-path is traversed one by one; a specified distance between the entity and the intersection entity (the distance may be determined by how many entities between the entity and the intersection entity) is determined, with the intersection entity as a starting point, among each entity linked by each edge contained in the reference meta-path of the meta-path, an entity whose distance to the intersection entity is the specified distance is searched and to be used as a related entity having a related relationship with the entity; in the knowledge graph, whether an edge exists between the entity and the related entity of the entity is determined, if not, the related entity of the entity and the entity are defined as a plurality of entities having a related relationship with each other but not connected by an edge; and a hyperedge is constructed based on the plurality of entities, i.e., a related relationship between the plurality of entities is established.

In one or more embodiments of the present disclosure, if two intersection entities (the same entities) between the meta-path and the reference meta-path of the meta-path exist, any one of the two intersection entities can be used as the starting point, which is not limited in the present disclosure.

For example, for reference meta-path $p_2$ of meta-paths $p_1$ and meta-path $p_1$, by using the intersection entity $e_1$ between $p_1$ and $p_2$ as a starting point, other entities, other than $e_1$, linked by each edge contained in $p_1$ are traversed one by one, i.e., entity $e_2$ and entity $e_4$, and it is determined that the specified distance between entity $e_2$ and entity $e_1$ is 0 number of entities between them, and then, by using the intersection entity $e_1$ as a starting point, an entity having the specified distance from entity $e_1$ is searched among each entity linked by each edge contained in reference meta-path $p_2$ of meta-path $p_1$, i.e., $e_3$ is found and used as a related entity of entity $e_2$, and $e_2$ and $e_3$ are not directly connected by an edge, therefore, it is determined that entity $e_2$ and entity $e_3$ are a plurality of entities that have a related relationship but are not connected by an edge, and entity $e_2$ and entity $e_3$ may form a hyperedge.

In addition, it should be noted that, the number of reference meta-paths corresponding to one meta-path is not limited in the present disclosure, and may be one or more, for example, for meta-path $p_1$, the reference meta-paths having the same starting entity as meta-path $p_1$ include $p_2$ and $p_3$, and the reference meta-paths having the same ending entity as meta-path $p_1$ include $p_4$, in fact, the meta-path $p_1$ corresponds to three meta-paths. Thus, when the related entities of each entity on the meta-path are to be determined, the intersection entity may be used as a starting point, and among each entity linked by each edge contained in each reference meta-path corresponding to the meta-path, a plurality of entities whose distances from the intersection entity are a specified distance are searched for respectively, and used as a plurality of related entities having a related relationship with the entity. For example, for meta-path $p_1$, which intersects reference meta-paths $p_2$ and $p_3$ at entity $e_1$, with $e_1$ as the starting point, when the related entities of entity $e_2$ linked by $p_1$ are searched for, entity $e_3$ may actually be found on reference meta-path $p_2$, and meanwhile, entity $e_6$ may be found on reference meta-path $p_3$, both entity $e_3$ and entity $e_6$ may be used as the related entities of entity $e_2$, and the hyperedges are established based on entity $e_2$, entity $e_3$, and entity $e_6$.

Based on the method for constructing a hyperedge provided in the present disclosure, a link relationship related to the subject and object (the subject entity is a satellite, and the object entity is a satellite event) of event prediction may be established, specifically, in the satellite orbit threat domain, the hyperedge may include a satellite-satellite link relationship between each of the satellites having a common satellite event, a satellite-satellite link relationship between each of the satellites moving in the same orbit in the knowledge graph, a satellite event-satellite event link relationship between each of the events having an event relationship with the same satellite, a satellite event-satellite event link relationship between each of the events that are mutually reachable to the same satellite-orbit triplet in the knowledge graph, a motion orbit-motion orbit link relationship between each of the different motion orbits along which the same satellite moves separately in the knowledge graph, etc. The above-described examples are only some examples of hyperedges that can be constructed by the hyperedge construction scheme provided in the present disclosure, which does not mean that only the above-described types of hyperedges are constructed.

S104: an entity feature corresponding to each entity is determined through a feature extraction network in a to-be-trained prediction model.

Specifically, the prediction model used in the present disclosure includes a feature extraction network and a prediction network, where the feature extraction network is configured to determine an entity feature corresponding to each entity, and the prediction network is configured to, based on a feature input to the prediction network, determine a predicted incidence relationship between a satellite entity and a satellite event entity, so as to predict whether a corresponding satellite event occurs on the satellite entity.

In the training process of the to-be-trained prediction model, the feature extraction network may be initialized first, and the parameter initialization method may be random initialization or xavier initialization, which is not limited in the present disclosure. Then, the attribute information of each entity is determined from the database, and the attribute information of each entity is input to the feature extraction network, to determine an entity feature corresponds to each entity. The entity feature is actually a corresponding entity represented by using an encoding vector, such that in a subsequent step, features of each entity are further optimized based on complex relationships between a meta-path and each entity represented by a hyperedge, so as to obtain a more comprehensive and accurate encoding vector to objectively represent the entity.

In some embodiments, in the present disclosure, a method of determining the feature weight by using an attention network may further be used, to enhance the semantic expression capability of the features of the entities. A specific scheme is described below.

At the first step: for each entity, by inputting the entity into a feature extraction network in a to-be-trained prediction model, an initialization feature of the entity output by the feature extraction network is obtained.

At the second step: according to the initialization feature of the entity and the initialization features of each entity contained in the hyperedge that the entity belongs to, a weight corresponding to the entity is determined through an attention network in the to-be-trained prediction model.

In the present disclosure, an attention (especially soft-attention) mechanism is used to weight an initialization feature of an internal entity of each hyperedge, to obtain a weighted feature as an entity feature corresponding to the entity. The method of determining the weight through the attention mechanism and weighting the initialization feature of the entity may highlight the feature information of an important entity and reduce the influence of the unimportant entity.

Specifically, for each entity $e_i$, the initialization feature of the entity output by the feature extraction network is $f_i$, and the attention network is used to calculate the weight corresponding to the initialization feature of the entity, to determine the contribution degree of each entity to the feature representation in the hyperedge. The following is an optional implementation of determining the weight based on the attention network:

$$\alpha_i = \frac{\exp\left(u^T \tan h(W_a f_i + b_a)\right)}{\sum_{k=1}^{n} \exp\left(u^T \tan h(W_a f_i + b_a)\right)}$$

Where $a_i$ is the weight corresponding to the initialization feature of entity $e_i$, $W_a$ and $b_a$ are to-be-learned network parameters in the attention network, and $u$ is a soft-attention weight vector.

At the third step: by weighting the initialization feature of the entity with the weight corresponding to the entity, an entity feature corresponding to the entity is obtained.

The following is an optional implementation of the entity feature corresponding to the entity:

$$f_i^* = \alpha_i f_i$$

Where $$f_i^*$$

is the entity feature corresponding to entity $e_i$.

In this way, the entity features in the hyperedge may be weighted, so as to better capture the feature information of important entities and reduce the influence of unimportant entities.

S106: for each entity, according to respective entities that are linked by respective edges contained in a meta-path that an edge connected to the entity belongs to and respective entities contained in the hyperedge that the entity belongs to, a target tree structure with the entity as a root node is constructed, entity features of respective entities contained in the target tree structure corresponding to the entity are aggregated to determine a target feature of the entity.

Based on the meta-path and the hyperedge obtained in the foregoing steps, the complex incidence relationships between each entity in the knowledge graph can be comprehensively represented, to fuse the complex incidence relationships between each entity into the feature expression of each entity, for each entity, based on the meta-path where the entity is and the hyperedge that the entity belongs to, respective entities having a direct incidence relationship and respective entities having an indirect incidence relationship with the entity are determined, and based on the entities, a target tree structure with the entity as a root node is constructed, and the target tree structure may include an incidence relationship between the entity and another entity and represented by the meta-path, and include a related relationship between the entity and another entity and represented by the hyperedge.

The entity features of respective entities contained in the target tree structure of the entity are aggregated from bottom to top, and the aggregated feature is used as the target feature of the entity, which is essentially feature propagation and fusion performed on the complex incidence relationships between the entity and other entities, and the complex incidence relationships between the entity and other entities are modeled into the target feature of the entity, thereby improving the expression capability of the knowledge graph representation and providing more accurate input for subsequent event prediction.

S108: according to any one satellite entity and any one satellite event entity among the entities, forming each entity-pair; for each entity-pair, at least according to a target feature of a satellite entity in the entity-pair and a target feature of a satellite event entity in the entity-pair, an input feature of the entity-pair is determined; the input features of the entity-pair are input into a prediction network in a to-be-trained prediction model to obtain a predicted incidence relationship between a satellite entity and a satellite event entity in the entity-pair; and according to a difference between the incidence relationship between the satellite entity and the satellite event entity in the entity-pair in the knowledge graph and the predicted incidence relationship, the to-be-trained prediction model is trained.

In the present disclosure, the prediction model may, according to the target feature of the satellite entity and the target feature of the satellite event entity, determine whether an incidence relationship exists between the satellite entity and the satellite event entity, or which type of incidence relationships exists, i.e., whether a satellite event corresponding to the satellite event entity occurs on a satellite corresponding to the satellite entity. Thus, in a training process of the prediction model, an input feature input to the prediction network may include at least a target feature of one satellite entity and a target feature of one satellite event entity. In order to improve the construction efficiency of input features, any one of entities and any one of satellite event entities contained in the knowledge graph may first form an entity-pair. In this way, each entity-pair includes a satellite entity and a satellite event entity, and in the knowledge graph, the satellite entity and the satellite event entity in the entity-pair may be connected by an edge (i.e., the satellite entity and the satellite event entity have an incidence relationship), or may not be connected by an edge (that is, the satellite entity and the satellite event entity have no incidence relationships).

In some embodiments, in the knowledge graph, when a satellite entity and a satellite event entity in an entity-pair are connected by an edge, according to a target feature of the satellite entity, a target feature of the satellite event entity, and an edge feature corresponding to the edge between the satellite entity and the satellite event entity in the entity-pair, an input feature of the entity-pair may further be determined.

The edge feature corresponding to the edge between the satellite entity and the satellite event entity in the entity-pair may be obtained in the implementations described below.

The first type: by element-wise multiplying the target feature of the satellite entity and the target feature of the satellite event entity, the edge feature corresponding to the edge between the satellite entity and the satellite event entity is obtained.

The second type: the edge feature is obtained by using a self-gating layer in a prediction model. Specifically, for each entity-pair, in the knowledge graph, in response to determining that the satellite entity in the entity-pair and the satellite event entity in the entity-pair are connected by an edge, according to the entity feature of the satellite entity in the entity-pair and the entity feature of the satellite event entity in the entity-pair, a first gating weight and a second gating weight are determined through a self-gating layer in the to-be-trained prediction model. The entity feature of the satellite entity in the entity-pair is weighted with the first gating weight, the entity feature of the satellite event entity in the entity-pair is weighted with the second gating weight, and according to a weighted entity feature of the satellite entity and a weighted entity feature of the satellite event entity, an edge feature corresponding to the edge between the satellite entity in the entity-pair and the satellite event entity in the entity-pair is determined.

Specifically, the self-gating layer may regulate information flow between the satellite entity and the satellite event entity by calculating gating weights respectively corresponding to the satellite entity and the satellite event entity, so as to capture the semantic of the edge connecting the satellite entity and the satellite event entity. An optional implementation of determining the first gating weight and the second gating weight by a self-gating layer is as follows:

$$g_1 = \sigma\left(W_g\left[f_i^{satellite}; f_i^{event}\right] + b_g\right)$$

$$g_2 = 1 - g_1$$

Where $g_1$ represents the first gating weight, and is used to indicate a contribution degree of the entity feature of the satellite entity to the edge feature. $g_2$ represents a second gating weight, and is used to indicate a contribution degree of the entity feature of the satellite event entity to the edge feature. $W_g$ and $b_g$ are parameters of the self-gating layer, and may be learned in a training process of the prediction model. $\sigma$ is an activation function.

$$[f_i^{satellite}; f_i^{event}]$$

represents a spiced vector obtained by splicing the entity feature $$f_i^{satellite}$$

of the satellite entity and the entity feature $$f_i^{event}$$

of the satellite entity.

Thus, an optional implementation of determining the edge feature $g_{i,j}$ is as follows:

$$g_{i,j} = g_1 \odot f_i^{satellite} + g_2 \odot f_i^{event}$$

Then, the target feature of the satellite entity in the entity-pair, the target feature of the satellite event entity in the entity-pair, and the edge feature corresponding to the edge between the satellite entity in the entity-pair and the satellite event entity in the entity-pair are spliced to obtain the input feature of the entity-pair.

Further, after the input feature of each entity-pair is determined, the input feature of each entity-pair is respectively input to the prediction network of the to-be-trained prediction model, and the predicted incidence relationship output by the prediction network may be a prediction result (predicted probability) used to indicate whether there is an incidence relationship between a satellite entity and a satellite event entity in the entity-pair, or may be a prediction result used to indicate which type of incidence relationships exists between a satellite entity and a satellite event entity in the entity-pair. Thus, the actual incidence relationship (the incidence relationship exists if there is an edge, and does not exist if there are no edges) between the satellite entity and the satellite event entity contained in the entity-pair in knowledge graph is used as a label, the loss function is determined according to the difference between the predicted incidence relationship output by the prediction network and the actual incidence relationship in the knowledge graph, and with minimization of the loss function as a training goal, the to-be-trained prediction model is trained by using a supervised learning manner.

Of course, the contrastive learning scheme may further be used to train the prediction model. Then, the predicted incidence relationship output by the prediction model may be a predicted association probability. The greater the predicted association probability is, the greater the probability that there is an incidence relationship between the satellite entity and the satellite event entity in the entity-pair is. The smaller the predicted association probability is, the smaller the probability that there is an incidence relationship between the satellite entity and the satellite event entity in the entity-pair is. During training, an entity-pair having an edge between the satellite entity and the satellite event entity may be used as a positive, and an entity-pair having no edge between the satellite entity and the satellite event entity may be used as a negative, with the maximization of the predicted association probability of the positives output by the prediction network and the minimization of the predicted association probability of the negatives output by the prediction network as a training goal, the to-be-trained prediction model is trained.

The loss function used to train the prediction model in the present disclosure may be constructed by using any existing type of loss function, such as a mean square error loss and a cross entropy loss, and which specific manner for training is not limited in the present disclosure.

S110: in response to a prediction request, a predicted incidence relationship between a to-be-predicted satellite and a to-be-predicted satellite event is determined through the trained prediction model.

After the training of the prediction model is completed, the satellite events that can occur on the to-be-predicted satellite may be predicted based on the trained prediction model. In the present disclosure, the to-be-predicted satellite and the to-be-predicted satellite event may be mapped to the knowledge graph of the satellite orbit threat domain. A meta-path and a hyperedge containing the to-be-predicted satellite are determined through the foregoing steps S102~S108 sequentially, the entity feature of the to-be-predicted satellite is obtained through the trained prediction model, the tree structure with the to-be-predicted satellite as the root node is constructed based on the meta-path and the hyperedge containing the to-be-predicted satellite, and features of respective entities contained in the tree structure are aggregated, and the entity feature of the to-be-predicted satellite is updated to obtain the target feature of the to-be-predicted satellite. The same procedure is used for the to-be-predicted satellite event, to obtain the target feature of the to-be-predicted satellite event. Then, the target feature of the to-be-predicted satellite and the target feature of the to-be-predicted satellite event are spliced, and the spliced feature is input to a prediction network of a trained prediction model, to obtain a predicted incidence relationship output by the prediction network, where the predicted incidence relationship is used to indicate a possibility that an incidence relationship exists between the to-be-predicted satellite and the to-be-predicted satellite event, or which type of incidence relationship exists. The predicted incidence relationship may be in a form of a predicted association probability, for example, the prediction network outputs a predicted association probability of 0.9, which indicates that there is a relatively high possibility of an incidence relationship between the to-be-predicted satellite and the to-be-predicted satellite event, or may be in a form of a predicted incidence relationship type, for example, the prediction network outputs an incidence relationship of a close approach type between the to-be-predicted satellite and the to-be-predicted satellite event.

In the event prediction method based on a satellite orbit threat domain knowledge graph provided in the present disclosure, a satellite orbit threat domain knowledge graph is constructed, and complex algorithms and modules are used to perform steps such as meta-path construction, hyperedge construction, feature encoding, and feature aggregation, which enhances the understanding and grasp of entity association and link features, thereby comprehensively and accurately understanding and describing complex relationships of the satellite orbit threat domain, and improving the accuracy of event prediction. Meanwhile, by processing the knowledge graph and the related features, the performance of the prediction model is optimized, and the efficiency and accuracy of event prediction are improved.

It can be seen that, by constructing a method based on a knowledge graph and combining complex feature processing and model optimization technologies, the event prediction method based on a satellite orbit threat domain knowledge graph provided in the present disclosure effectively improves accuracy and efficiency of event prediction in the satellite orbit threat domain, enhances understanding of entity association, improves grasp of link features, and optimizes performance of a prediction model, to provide more reliable support for decision-making and handling in a related domain.

In an optional embodiment of the present disclosure, the second step in the scheme of constructing a hyperedge based on each meta-path in step S102 shown in FIG. 1 may be specifically implemented through the embodiment described below.

At the first step: incidence relationship types corresponding to respective edges contained in the meta-path are determined respectively, and incidence relationship types corresponding to respective edges contained in a reference meta-path corresponding to the meta-path are determined respectively.

Specifically, when determining entities that are not connected by using an edge but have a related relationship, an incidence relationship type of an edge connecting an intersection entity and these entities on a meta-path may further be considered. Therefore, before each entity linked by each edge of the meta-path is traversed, an incidence relationship type corresponding to each edge contained in the meta-path and an incidence relationship type corresponding to each edge contained in the reference meta-path of the meta-path respectively may be determined first.

At the second step: by using an intersection entity between the meta-path and a reference meta-path of the meta-path as a starting point, whether the incidence relationship type corresponding to each edge contained in the meta-path is the same as the incidence relationship type corresponding to each edge contained in a reference meta-path corresponding to the meta-path is sequentially determined, and a determination result between each edge contained in the meta-path and each edge contained in a reference meta-path corresponding to the meta-path is obtained, until the determination result indicates that the incidence relationship types are different or edges contained in the meta-path are traversed.

Further, according to the incidence relationship type corresponding to each edge contained in the meta-path and the incidence relationship type corresponding to each edge contained in the reference meta-path of the meta-path, each edge with the same incidence relationship type is sequentially determined.

Specifically, by using an intersection entity between the meta-path and a reference meta-path of the meta-path as a starting point, it is sequentially determined whether each edge in the meta-path and each edge in a reference meta-path corresponding to the meta-path are the edges of the same incidence relationship type, and if yes, the determination result is the same, and if not, the determination result is different. It is determined one by one until the determination result is different, or edges contained in the meta-path are traversed.

For example, the structure shown in FIG. 2 is still used as an example. For meta-path $p_1=(r_{12}, r_{24})$, the incidence relationship type of each edge in $p_1$ is (close approaching, moving). For reference meta-path $p_2=(r_{13}, r_{35})$ of $p_1$, the incidence relationship type of each edge in $p_2$ is (close approaching, moving). The intersection entity between $p_1$ and $p_2$ is $e_1$, then with $e_1$ as a starting point, it is sequentially determined whether the incidence relationship types of each edge in $p_1$ is the same as the incidence relationship types of each edge in $p_2$. First, it is determined whether the incidence relationship types of $r_{12}$ in $p_1$ and $r_{13}$ in $p_2$ are the same, and since the incidence relationship type of $r_{12}$ is "close approaching" and the incidence relationship type of $r_{13}$ is also "close approaching", it is determined that the incidence relationship types of $r_{12}$ and $r_{13}$ are the same. Then, it is determined whether the incidence relationship types of $r_{24}$ in $p_1$ and $r_{35}$ in $p_2$ are the same, and since the incidence relationship type of $r_{24}$ is "moving" and the incidence relationship type of $r_{35}$ is also "moving", it is determined that the incidence relationship types of $r_{24}$ and $r_{35}$ are the same. Then, since all the edges contained in $p_1$ have been traversed, the determination ends.

For another example, for meta-path $p_1=(r_{12}, r_{24})$, the incidence relationship type of each edge in $p_1$ is (close approaching, moving). For reference meta-path $p_3=(r_{16}, r_{65})$ of $p_1$, the incidence relationship type of each edge in $p_3$ is (being close approached, moving). The intersection entity between $p_1$ and $p_3$ is $e_1$, then with $e_1$ as the starting point, it is determined sequentially whether the incidence relationship type of each edge in $p_1$ is the same as the incidence relationship type of each edge in $p_3$, firstly, it is determined whether the incidence relationship type of $r_{12}$ in $p_1$ is the same as the incidence relationship type of $r_{16}$ in $p_3$, since the incidence relationship type of $r_{12}$ is "close approaching" and the incidence relationship type of $r_{16}$ is "being close approached", it is determined that the incidence relationship types of $r_{12}$ and $r_{16}$ are different. The determination result based on $r_{12}$ and $r_{16}$ indicates that the incidence relationship types are different, so the determination is directly ended, and only the determination result that the incidence relationships of $r_{12}$ in $p_1$ and $r_{16}$ in $p_3$ are different is obtained.

At the third step: an entity linked by an edge contained in the meta-path and an entity linked by an edge contained in a reference meta-path corresponding to the meta-path, that have a determination result that the incidence relationship types are the same, are determined as a plurality of entities having a related relationship and not connected by an edge.

In this step, when the plurality of entities having a related relationship and not connected by an edge are determined, only each entity on the meta-path and each entity on the reference meta-path of the meta-path whose determination result is that the incidence relationship types are the same are retained, and an entity whose determination result is that the incidence relationship types are different is removed, such that the related relationship between the entities used for constructing the hyperedge is more compact and more practical for event prediction.

Specifically, according to the determination result corresponding to each edge in the meta-path, the meta-path and the reference meta-path of the meta-path are pruned first, and the edge with different incidence relationship types is temporarily removed and not used as the edge traversed when determining the hyperedge. Then, by using the intersection entity (the same entity) between the meta-path and the reference meta-path of the meta-path as a starting point, respective entities other than the intersection entity linked by each edge contained in the meta-path are traversed one by one, and a specified distance between the entity and the intersection entity (the distance may be determined by how many entities between the entity and the intersection entity) is determined. On the other hand, with the intersection entity as a starting point, among each entity linked by each edge contained in the reference meta-path of the meta-path, an entity whose distance to the intersection entity is the specified distance is searched for, which is used as a related entity having a related relationship with the intersection entity. Then, in the knowledge graph, it is determined whether there is an edge between the entity and a related entity of the entity, and if there is no edge between the entity and the related entity of the entity, the entity and the related entity of the entity are defined as a plurality of entities that have a related relationship with each other but are not connected by an edge, and a hyperedge is constructed according to the plurality of entities, i.e., the related relationship between the plurality of entities is established.

For example, still using the foregoing example, the two determination results between the two edges of meta-path $p_1=(r_{12}, r_{24})$ and the two edges of reference meta-path $p_2=(r_{13}, r_{35})$ of $p_1$ are both having the same incidence relationship type, so it is unnecessary to prune meta-path $p_1$ and reference meta-path $p_2$. Respective entities other than $e_1$ linked by each edge contained in $p_1$ is directly traversed, according to the specified distance from $e_2$ in $p_1$ to $e_1$, $e_3$ in $p_2$ is determined as a related entity of entity $e_2$, and according to the specified distance from $e_4$ in $p_1$ to $e_1$, $e_5$ in $p_2$ is determined as a related entity of entity $e_4$. In the knowledge graph, there is no directly connected edge between entity $e_2$ and entity $e_3$, and there is no directly connected edge between entity $e_4$ and entity $e_5$, therefore, it is determined that entity $e_2$ and entity $e_3$ are the plurality of entities that have a related relationship but are not connected by an edge, and entity $e_2$ and entity $e_3$ may form a hyperedge. It is determined that entity $e_4$ and entity $e_5$ are the plurality of entities that have a related relationship but are not connected by an edge, and entity $e_4$ and entity $e_5$ may also form a hyperedge.

However, for meta-path $p_1$ and reference meta-path $p_3$ in the foregoing example, because a determination result between the edge $r_{12}$ in $p_1$ and the edge $r_{16}$ in $p_3$ indicates that incidence relationship types of the two are different, after meta-path $p_1$ and reference meta-path $p_3$ are pruned according to the determination result, an entity linked by an edge contained in meta-path $p_1$ and an entity linked by an edge contained in the reference meta-path $p_3$ that may be used to determine a hyperedge are both pruned, therefore a plurality of entities that have a related relationship and are not connected by an edge cannot be determined according to meta-path $p_1$ and reference meta-path $p_3$, and a hyperedge cannot be constructed.

Using the foregoing scheme to construct a hyperedge substantially reduces the number of hyperedges, although some more complex related relationships are ignored, complex relationships between entities that help event prediction in the satellite orbit threat domain may be modeled more emphatically, thereby improving efficiency and reducing computing power and resources consumed in unnecessary complex relationship modeling while ensuring accuracy of event prediction.

Figure 3:
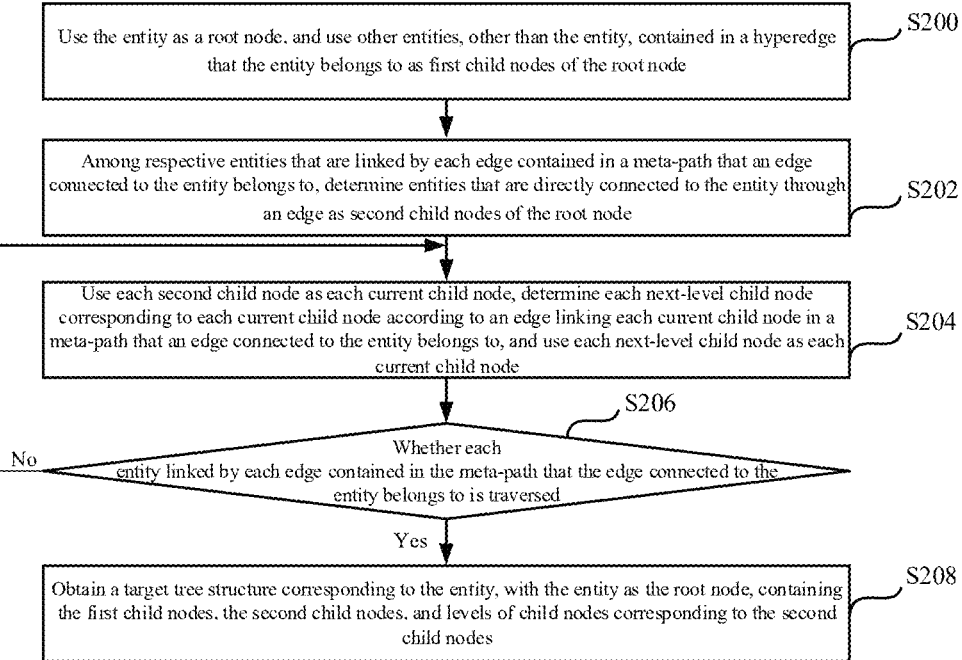
FIG. 3 is a flow diagram of an event prediction method based on a satellite orbit threat domain knowledge graph according to the present disclosure.

In an optional embodiment of the present disclosure, the constructing a target tree structure corresponding to each entity in step S016 shown in FIG. 1 is specifically implemented in the embodiment described below, as shown in FIG. 3.

At S200: the entity is used as a root node, and other entities, other than the entity, contained in a hyperedge that the entity belongs to are used as first child nodes of the root node.

Specifically, the hyperedge constructed based on the foregoing one or more embodiments is actually a related relationship between entities that is not reflected in the knowledge graph but exists objectively, and the related relationship between the entities represented by the hyperedge is introduced into the target tree structure, which may introduce a complex related relationship that is not reflected in the knowledge graph for the target feature of the entity, thereby improving the dimension and the scale of information contained in the target features of the entities.

Thus, when the entity is used as a root node, one or more hyperedges that the entity belongs to are determined, and other entities, other than the entity, that are contained in the hyperedge that the entity belongs to are all used as next-level first child nodes of the root node.

Figure 4:
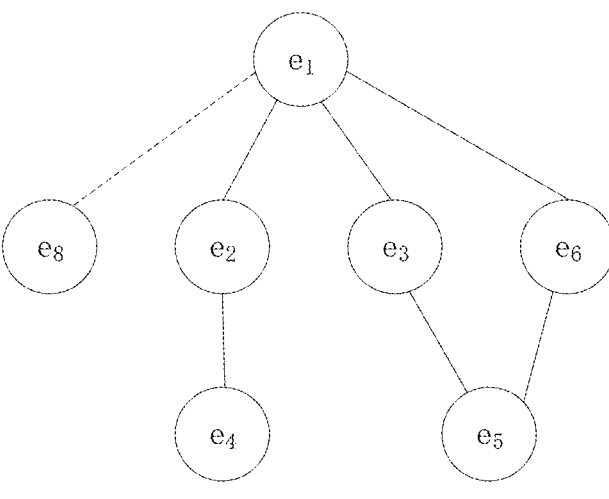
FIG. 4 is a diagram of a target tree structure according to the present disclosure.

For example, FIG. 2 shows a partial graph structure in the knowledge graph, when entity $e_1$ is used as a root node, a hyperedge that $e_1$ belongs to is first determined, and a hyperedge constructed by using $e_2$ and $e_8$ is used as an example, entity $e_1$ is used as a root node, the next-level first child nodes of the root node includes entity $e_8$, and in the target tree structure of entity $e_1$ shown in FIG. 4, entity $e_1$ and entity $e_8$ are connected by using a dashed line, which indicates that a relationship between entity $e_1$ and entity $e_8$ for the root node and the child node comes from a hyperedge.

At S202: among respective entities that are linked by each edge contained in a meta-path that an edge connected to the entity belongs to, entities that are directly connected to the entity through an edge are determined as second child nodes of the root node.

Then, entities linked by the meta-path that the edge connected to the entity belongs to are introduced into the target tree structure with the entity as the root node.

First, one or more edges connected to the entity are determined, entities directly connected to the entity through edges are determined according to the determined one or more edges, and these entities are used as second child nodes of the root node.

Still using the foregoing example as an example, entity $e_1$ is a root node, with edges connected to entity $e_1$ are $r_{12}$, $r_{13}$ and $r_{16}$, and entity $e_2$ directly connected to entity $e_1$ is determined according to edge $r_{12}$ and a meta-path $p_1$ that $r_{12}$ belongs to. Entity $e_3$ directly connected to entity $e_1$ is determined according to edge $r_{13}$ and meta-path $p_2$ that $r_{13}$ belongs to. Entity $e_6$ directly connected to entity $e_1$ is determined according to edge $r_{16}$ and meta-path $p_3$ that $r_{16}$ belongs to. In this way, entity $e_2$, entity $e_3$, and entity $e_6$ are determined as three second child nodes of the root node $e_1$.

It may be understood that, the first child node and the second child node are entities having a direct incidence relationship and a direct related relationship with the entity. Therefore, when the entity is used as the root node, in the target tree structure of the entity, both the first child node and the second child node are actually next-level child nodes of the root node, that is, the first child node and the second child node are child nodes of the same level, and "first" and "second" are merely used in the present disclosure to distinguish that some child nodes among next-level child nodes of the root node are from a hyperedge that an entity corresponding to the root node belongs to, and other child nodes are from a meta-path where the entity corresponding to the root node is.

At S204: each second child node is used as each current child node, each next-level child node corresponding to each current child node is determined according to an edge linking each current child node in a meta-path that an edge connected to the entity belongs to, and each next-level child node is used as each current child node.

To establish the target tree structure that can completely describe the complex relationship between the entities, after the next-level child nodes (the first child nodes and the second child nodes) of the root node are determined, the target tree structure continues to extend from each second child node according to the meta-path that the edge connected to the entity belongs to, and the complete structure (the connection relationships between entities) contained in the meta-path that the edges connected to the entity belong to are introduced into the target tree structure of the entity.

To this end, each second child node is used as each current child node, and each next-level child node corresponding to each current child node is determined according to an edge linking each current child node in each edge contained in a meta-path that an edge connected to the entity belongs to.

Still using FIG. 2 and FIG. 4 as examples, the second child nodes include entity $e_2$, entity $e_3$, and entity $e_6$, and by using entity $e_2$ as a current child node, it is determined that in edges $r_{12}$ and $r_{24}$ contained in a meta-path $p_1$ that an edge $r_{12}$ connected to entity $e_1$ belongs to, an edge connected to entity $e_2$ is $r_{24}$, and according to edge $r_{24}$, a next-level child node corresponding to the current child node $e_2$ is $e_4$. Based on the same scheme, it may be determined that the next-level child node corresponding to the current child node $e_3$ is $e_5$, and the next-level child node corresponding to the current child node $e_6$ is $e_5$. Then, the next-level child node $e_4$ corresponding to the current child node $e_2$ and the next-level child node $e_5$ corresponding to the current child nodes $e_3$ and $e_6$ are re-used as the current child nodes.

At S206: whether each entity linked by each edge contained in the meta-path that the edge connected to the entity belongs to is traversed; if yes, step S208 is performed; and if not, step S204 is returned to.

At S208: a target tree structure corresponding to the entity, with the entity as the root node, containing the first child nodes, the second child nodes, and levels of child nodes corresponding to the second child nodes are obtained.

The root node, each first child node, each second child node, and each level of child node corresponding to each second child node that are obtained based on the foregoing scheme are separately connected based on a level and a correspondence, to obtain the target tree structure corresponding to the entity. FIG. 4 shows a target tree structure with entity $e_1$ as a root node constructed based on the graph structure shown in FIG. 2.

Figure 5:
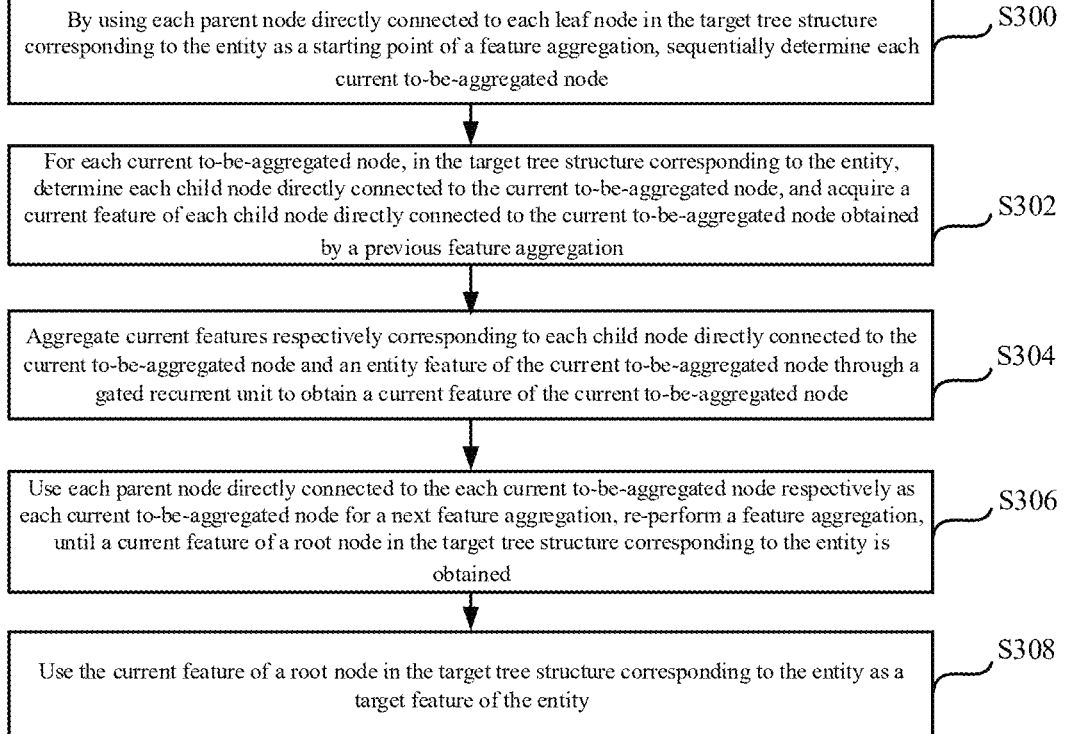
FIG. 5 is a flow diagram of an event prediction method based on a satellite orbit threat domain knowledge graph according to the present disclosure.

Further, an implementation of aggregating, based on the target tree structure model, the entity features of the entities contained in the target tree structure corresponding to the entity to determine the target feature of the entity in step S106 shown in FIG. 1 is described below, as shown in FIG. 5.

At S300: by using each parent node directly connected to each leaf node in the target tree structure corresponding to the entity as a starting point of a feature aggregation, each current to-be-aggregated node is sequentially determined.

In order to improve the accuracy of the event prediction of the prediction model, by aggregating the features of the entities contained in the target tree structure corresponding to each entity in the knowledge graph to obtain the target feature of the entity, the features of the entities having a direct or indirect related relationship with the entity are propagated and aggregated into the entity, the temporal dynamic evolution process of time is accurately captured, and the expression capability of the entity features is enhanced, thereby improving the accuracy and reliability of the event prediction.

Specifically, in the present disclosure, feature aggregation is performed on each node in the target tree structure layer by layer from each leaf node of the target tree structure of the entity in a bottom-up aggregation manner. Specifically, in the target tree structure of the entity, features of parent nodes directly connected to leaf nodes are obtained by aggregating features of the first layer. That is, each parent node directly connected to each leaf node is used as each current to-be-aggregated node in the first feature aggregation, and then the current to-be-aggregated nodes are sequentially determined layer by layer upward until the current to-be-aggregated node is the root node of the target tree structure of the entity, that is, the entity. Therefore, by analogy, after the first feature aggregation is performed, each parent node directly connected to each current to-be-aggregated node in the first feature aggregation is used as each current to-be-aggregated node in the second feature aggregation, and details are not described below again.

For example, for the target tree structure corresponding to entity $e_1$ shown in FIG. 4, leaf nodes are $e_8$, $e_4$ and $e_5$, and parent nodes directly connected to the leaf nodes through edges are $e_1$, $e_2$, $e_3$ and $e_6$.

At S302: for each current to-be-aggregated node, in the target tree structure corresponding to the entity, each child node directly connected to the current to-be-aggregated node is determined, and a current feature of each child node directly connected to the current to-be-aggregated node obtained by a previous feature aggregation is acquired.

When each child node directly connected to the current to-be-aggregated node is a leaf node in the target tree structure corresponding to the entity, a current feature of each child node directly connected to the current to-be-aggregated node is an entity feature of each child node directly connected to the current to-be-aggregated node.

Further, bottom-up layer-by-layer aggregation may be updating the feature of the current to-be-aggregated node based on the feature of each child node corresponding to the current to-be-aggregated node in the target tree structure, such that the updated feature of the current to-be-aggregated node includes the feature of the current to-be-aggregated node itself, and includes features of other nodes having an incidence relationship with the current to-be-aggregated node. To this end, the current feature of each child node directly connected to the current to-be-aggregated node may be determined first, which is divided into the two cases described below.

The first case: each child node directly connected to the current to-be-aggregated node is a leaf node in the target tree structure corresponding to the entity, and at this time, the current to-be-aggregated node is actually the current to-be-aggregated node during the first time of feature aggregation, e.g., node $e_2$ shown in FIG. 4. Since each leaf node in the target tree structure is the beginning of feature aggregation, there is no "current feature obtained by the previous feature aggregation" for each leaf node, the entity feature corresponding to the entity obtained based on one or more of the foregoing embodiments may be used as the obtained current feature.

The second case: each child node directly connected to the current to-be-aggregated node is each current to-be-aggregated node during the previous feature aggregation. At this time, the current to-be-aggregated node is not actually the current to-be-aggregated node during the first time of feature aggregation, e.g., the node $e_1$ shown in FIG. 4. In this case, each child node corresponding to the current to-be-aggregated node in the current feature aggregation process is substantially the current to-be-aggregated node in the previous feature aggregation process. Therefore, the current feature obtained by the previous feature aggregation is directly acquired and applied to the current feature aggregation process.

At S304: current features respectively corresponding to each child node directly connected to the current to-be-aggregated node and an entity feature of the current to-be-aggregated node are aggregated through a gated recurrent unit, to obtain a current feature of the current to-be-aggregated node.

In the present disclosure, a gated recurrent unit (GRU) controls the flow of information by introducing a gating mechanism, thereby capturing long-term dependencies more effectively. The GRU has a simpler structure than the long short-term memory (LSTM) network, but still retains the core idea of the gating mechanism. Using GRU for feature aggregation can improve the understanding capability of the prediction model for complex relationships between entities, thereby improving the accuracy and generalization capability of the prediction model.

An optional implementation of aggregating the entity feature of the current to-be-aggregated node and the current features of each child node of the current to-be-aggregated node by using the gated recurrent unit may be:

$$h_v = GRU(\{f_v, h_u | u \in \text{Children}(v)\})$$

Where $f_v$ is the entity feature of the current to-be-aggregated node, and Children(v) represents a set of each child node u directly connected to the current to-be-aggregated node v. $h_u$ represents the current feature, obtained by the previous feature aggregation, of the child node u directly connected to the current to-be-aggregated node v.

Certainly, the current features of the child nodes may be aggregated first, and then the entity feature of the current to-be-aggregated node is updated with the aggregated feature. An optional implementation of performing feature aggregation by using a gated recurrent unit is as follows:

$$h_v^* = GRU(\{h_u | u \in \text{Children}(v)\})$$

$$h_v = \text{Update}(h_v^*, f_v).$$

Where $h_v^*$ represents an aggregation feature obtained by aggregating the current feature of each child node.

At S306: each parent node directly connected to the each current to-be-aggregated node respectively is used as each current to-be-aggregated node for a next feature aggregation, a feature aggregation is re-performed, until a current feature of a root node in the target tree structure corresponding to the entity is obtained.

After the current features respectively corresponding to respective current to-be-aggregated nodes are obtained, each parent node of the next upper level of the current to-beaggregated nodes is used as each current to-be-aggregated node of the next feature aggregation, and the above steps S302~S304 are repeatedly iterated, until the feature of the root node is obtained.

For example, still using FIG. 4 as an example, after the current features of the nodes $e_2$, $e_3$ and $e_6$ are respectively determined through steps S302~S304, parent node $e_1$ directly connected to the nodes $e_2$, $e_3$ and $e_6$ is used as the next current to-be-aggregated node for feature aggregation, and after the current feature of the node $e_1$ is obtained through feature aggregation, since the node $e_1$ is the root node of the target tree structure, the current feature of the node $e_1$ obtained through feature aggregation is used as the target feature of entity $e_1$.

At S308: the current feature of a root node in the target tree structure corresponding to the entity is used as a target feature of the entity.

Through such a bottom-up feature aggregation process, the entity features in each hyperedge can be effectively aggregated to the root node, forming an aggregated feature representation of the entities in the entire knowledge graph. Such a representation can better capture semantic relationships and structural information between entities in the knowledge graph, and provide more accurate input for subsequent event prediction tasks.

In an optional embodiment of the present disclosure, in step S108 shown in FIG. 1, when the to-be-trained prediction model is trained, the predicted incidence relationship output by the prediction network of the prediction model is represented by a predicted probability that there is an incidence relationship between the satellite entity and the satellite event entity. Specific implementations are described below.

Firstly, for each entity-pair, according to the incidence relationship between the satellite entity in the entity-pair and the satellite event entity in the entity-pair in the knowledge graph, the entity-pair with an edge between the satellite entity and the satellite event entity is used as a positive sample pair, and the entity-pair with no edges between the satellite entity and the satellite event entity is used as a negative sample pair.

Secondly, according to a first predicted probability of an incidence relationship existence between a satellite entity and a satellite event entity in each positive sample pair and a second predicted probability of an incidence relationship existence between a satellite entity and a satellite event entity in each negative sample pair, a loss function is determined. The loss function is inversely proportional to the first predicted probability, and the loss function is directly proportional to the second predicted probability.

Then, the to-be-trained prediction model is trained with minimization of the loss function as a training goal.

In the foregoing scheme, training the prediction model with minimization of the loss function as a training goal may be equivalent to training the prediction model with maximization of the first predicted probability of a positive sample pair output by the prediction network and minimization of a second predicted probability of a negative sample pair output by the prediction network as a training goal. When the loss function is determined according to the first predicted probability and the second predicted probability, the first predicted probability and the second predicted probability may respectively correspond to the same or different weights, which is not limited in the present disclosure.

In one or more embodiments of the present disclosure, as shown in FIG. 1, in the step S110, determining a predicted incidence relationship between a to-be-predicted satellite and a to-be-predicted satellite event through the trained prediction model may be implemented by using steps described below.

At the first step: attribute information of a to-be-predicted satellite and attribute information of a to-be-predicted satellite event is obtained; according to the attribute information of the to-be-predicted satellite and the attribute information of the to-be-predicted satellite event, in the knowledge graph, a first node corresponding to the to-be-predicted satellite and a second node corresponding to the to-be-predicted satellite event are determined; and in the knowledge graph, an edge between the first node and another node having an incidence relationship with the first node is established, and an edge between the second node and another node having an incidence relationship with the second node is established.

Specifically, the attribute information of the to-be-predicted satellite may include information such as a structure, a material, a size, a current motion orbit, and a historical motion orbit of the to-be-predicted satellite, and may further include a historical satellite event, such that when the to-be-predicted satellite is mapped to the knowledge graph, an edge between an entity node corresponding to the to-be-predicted satellite and another node in the knowledge graph may be established based on the attribute information of the to-be-predicted satellite. Similarly, the attribute information of the to-be-predicted satellite event may include a timestamp of the to-be-predicted satellite event, a subject (one or more satellites) of the satellite event, etc., such that when the to-be-predicted satellite event is mapped to the knowledge graph, an edge between an entity node corresponding to the to-be-predicted satellite event and another node in the knowledge graph may be established based on the attribute information of the to-be-predicted satellite event.

At the second step: according to the first node, the second node, an edge connected to the first node, and an edge connected to the second node, the knowledge graph is updated.

At the third step: a meta-path linking the first node and a meta-path linking the second node are extracted from the updated knowledge graph.

At the fourth step: according to each entity in a meta-path linking the first node, a plurality of entities having a related relationship and not connected by an edge with the first node are determined, and according to the determined plurality of entities, a first hyperedge containing the first node is constructed.

At the fifth step: according to each entity in a meta-path linking the second node, a plurality of entities having a related relationship and not connected by an edge with the second node are determined, and according to the determined plurality of entities, a second hyperedge containing the second node is constructed.

A specific scheme for determining the meta-path, the first hyperedge, and the second hyperedge is similar to the foregoing step S102, and details are not described herein again.

At the sixth step: according to the meta-path linking the first node and the first hyperedge, a tree structure with the first node as a root node is constructed, and through a feature extraction network in the trained prediction model and the tree structure corresponding to the first node, a target feature of the first node is determined.

At the seventh step: according to the meta-path linking the second node and the second hyperedge, a tree structure with the second node as a root node is constructed, and through a feature extraction network in the trained prediction model and the tree structure corresponding to the second node, a target feature of the second node is determined.

For determining the target feature of the first node and the target feature of the second node, refer to one or more embodiments shown in FIG. 1 to FIG. 4, and details are not described herein again.

At the eighth step: according to the target feature of the first node and the target feature of the second node, an input feature is determined, and the input feature is input into a prediction network in the trained prediction model to obtain a predicted incidence relationship between the to-be-predicted satellite entity and the to-be-predicted satellite event entity.

The above is an event prediction method based on a satellite orbit threat domain knowledge graph provided by one or more embodiments in the present specification. Based on the same idea, the present disclosure further provides a corresponding event prediction apparatus based on the satellite orbit threat domain knowledge graph, as shown in FIG. 6.

Figure 6:
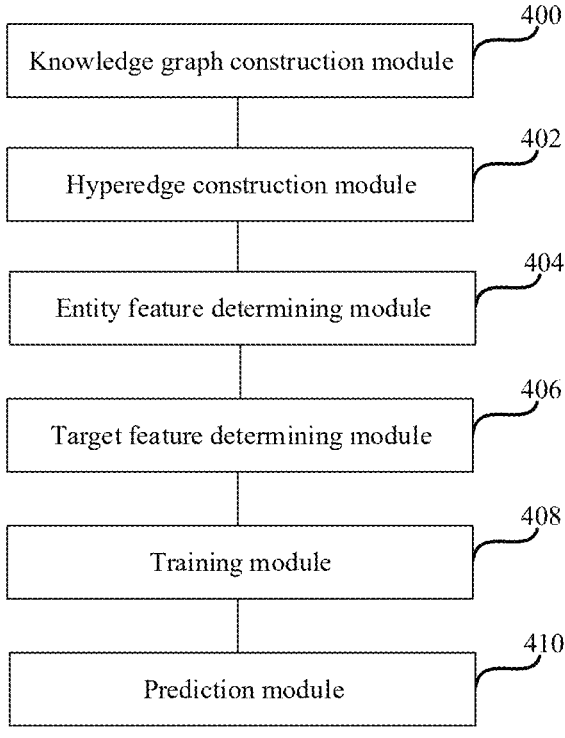
FIG. 6 is a diagram of an event prediction apparatus based on a satellite orbit threat domain knowledge graph according to the present disclosure.

FIG. 6 is a diagram of an event prediction apparatus based on a satellite orbit threat domain knowledge graph according to the present disclosure, includes:

a knowledge graph construction module 400, configured to: acquire a database of a satellite orbit threat domain; by respectively using entities stored in the database as nodes and using an incidence relationship between each entity as an edge, construct a knowledge graph of the satellite orbit threat domain; where the entities include a satellite, a satellite event, and a motion orbit, and the incidence relationship includes an event category and a motion state;

a hyperedge construction module 402, configured to: extract each meta-path from the knowledge graph; and for each meta-path, determine, according to each entity linked by each edge contained in the meta-path, a meta-path having the same starting entity and/or the same ending entity as the meta-path from respective meta-paths as a reference meta-path corresponding to the meta-path; determine, according to each entity linked by each edge contained in the meta-path and each entity linked by each edge contained in the reference meta-path corresponding to the meta-path, a plurality of entities having a related relationship and not connected by an edge; and construct, according to the determined plurality of entities, a hyperedge;

an entity feature determining module 404, configured to: determine an entity feature corresponding to each entity through a feature extraction network in a to-be-trained prediction model;

a target feature determining module 406, configured to, for each entity, construct, according to respective entities that are linked by respective edges contained in a meta-path that an edge connected to the entity belongs to and respective entities contained in the hyperedge that the entity belongs to, a target tree structure with the entity as a root node, aggregate entity features of respective entities contained in the target tree structure corresponding to the entity to determine a target feature of the entity;

a training module 408, configured to: form, according to any one satellite entity and any one satellite event entity in the entities, an entity-pair; determine, for each entity-pair, at least according to a target feature of a satellite entity in the entity-pair and a target feature of a satellite event entity in the entity-pair, an input feature of the entity-pair; obtain, by inputting the input feature of the entity-pair into a prediction network in a to-be-trained prediction model, a predicted incidence relationship between the satellite entity and the satellite event entity in the entity-pair; and train, according to a difference between the incidence relationship between the satellite entity and the satellite event entity in the entity-pair in the knowledge graph and the predicted incidence relationship, the to-be-trained prediction model; and a prediction module 410, configured to: in response to a prediction request, determine a predicted incidence relationship between a to-be-predicted satellite and a to-be-predicted satellite event through a trained prediction model.

In some embodiments, the hyperedge construction module 402 is configured to: determine an incidence relationship type corresponding to each edge contained in the meta-path; determine an incidence relationship type corresponding to each edge contained in a reference meta-path corresponding to the meta-path; by using an intersection entity between the meta-path and a reference meta-path of the meta-path as a starting point, sequentially determine whether the incidence relationship type corresponding to each edge contained in the meta-path is same as the incidence relationship type corresponding to each edge contained in the reference meta-path corresponding to the meta-path, and obtain a determination result between each edge contained in the meta-path and each edge contained in a reference meta-path corresponding to the meta-path, until the determination result indicates that the incidence relationship types are different or edges contained in the meta-path are traversed; and determine an entity linked by an edge contained in the meta-path and an entity linked by an edge contained in a reference meta-path corresponding to the meta-path, that have a determination result that the incidence relationship types are the same, as a plurality of entities having a related relationship and not connected by an edge.

In some embodiments, the entity feature determining module 404 is configured to: for each entity, obtain, by inputting the entity into the feature extraction network in the to-be-trained prediction model, an initialization feature of the entity output by the feature extraction network; determine, according to the initialization feature of the entity and the initialization features of respective entities contained in the hyperedge that the entity belongs to, a weight corresponding to the entity through an attention network in the to-be-trained prediction model; and obtain, by weighting the initialization feature of the entity with the weight corresponding to the entity, the entity feature corresponding to the entity.

In some embodiments, the target feature determining module 406 is configured to: use the entity as a root node, and use other entities, other than the entity, contained in the hyperedge that the entity belongs to as respective first child nodes of the root node; determine, among each entity that is linked by each edge contained in a meta-path that an edge connected to the entity belongs to, entities that are directly connected to the entity through edges as second child nodes of the root node; for each second child node, use the second child node as a current child node; determine, according to an edge linking the current child node in a meta-path that an edge connected to the entity belongs to, next-level child nodes corresponding to the current child node; for each next-level child node, by using the next-level child node as a current child node, re-determine next-level child nodes corresponding to the current child node, until all entities that are linked by edges contained in the meta-path that the edge connected to the entity belongs to are traversed; and obtain the target tree structure corresponding to the entity, with the entity as the root node, containing the first child nodes, the second child nodes, and respective levels of child nodes corresponding to each second child node.

In some embodiments, the target feature determining module 406 is configured to: by using each parent node directly connected to each leaf node in the target tree structure corresponding to the entity as a starting point of a feature aggregation, sequentially determine each current to-be-aggregated node; for each current to-be-aggregated node, in the target tree structure corresponding to the entity, determine each child node directly connected to the current to-be-aggregated node, and acquire a current feature of each child node directly connected to the current to-be-aggregated node obtained by a previous feature aggregation; obtain, by aggregating the current feature corresponding to each child node directly connected to the current to-be-aggregated node and an entity feature of the current to-be-aggregated node through a gated recurrent unit, a current feature of the current to-be-aggregated node; by using a parent node directly connected to each current to-be-aggregated node respectively as a current to-be-aggregated node for a next feature aggregation, re-perform a feature aggregation, until obtaining a current feature of the root node in the target tree structure corresponding to the entity; use the current feature of the root node in the target tree structure corresponding to the entity as the target feature of the entity; where, in response to determining that each child node directly connected to the current to-be-aggregated node is a leaf node in the target tree structure corresponding to the entity, a current feature of each child node directly connected to the current to-be-aggregated node is an entity feature of each child node directly connected to the current to-be-aggregated node.

In some embodiments, the training module 408 is configured to: for each entity-pair, in the knowledge graph, in response to determining that the satellite entity in the entity-pair and the satellite event entity in the entity-pair are connected by an edge, determine, according to the entity feature of the satellite entity in the entity-pair and the entity feature of the satellite event entity in the entity-pair, a first gating weight and a second gating weight through a self-gating layer in the to-be-trained prediction model; weight the entity feature of the satellite entity in the entity-pair with the first gating weight, weight the entity feature of the satellite event entity in the entity-pair with the second gating weight, and determine, according to a weighted entity feature of the satellite entity and a weighted entity feature of the satellite event entity, an edge feature corresponding to the edge between the satellite entity in the entity-pair and the satellite event entity in the entity-pair; and obtain, by splicing the target feature of the satellite entity in the entity-pair, the target feature of the satellite event entity in the entity-pair, and the edge feature corresponding to the edge between the satellite entity in the entity-pair and the satellite event entity in the entity-pair, an input feature of the entity-pair.

In some embodiments, the predicted incidence relationship between the satellite entity and the satellite event entity output by the prediction network is represented by a predicted probability that the incidence relationship exists between the satellite entity and the satellite event entity.

In some embodiments, the training module 408 is configured to: according to the incidence relationship between the satellite entity and the satellite event entity in the entity-pair in the knowledge graph, use an entity-pair with an edge between the satellite entity and the satellite event entity as a positive sample pair, and use an entity-pair with no edge between the satellite entity and the satellite event entity as a negative sample pair; determine, according to a first predicted probability of an incidence relationship existence between a satellite entity and a satellite event entity in the positive sample pair and a second predicted probability of an incidence relationship existence between a satellite entity and a satellite event entity in the negative sample pair, a loss function; where the loss function is inversely proportional to the first predicted probability, and the loss function is directly proportional to the second predicted probability; and train the to-be-trained prediction model with minimization of the loss function as a training goal.

In some embodiments, the prediction module 410 is configured to: obtain attribute information of the to-be-predicted satellite and attribute information of the to-be-predicted satellite event; determine, according to the attribute information of the to-be-predicted satellite and the attribute information of the to-be-predicted satellite event, in the knowledge graph, a first node corresponding to the to-be-predicted satellite and a second node corresponding to the to-be-predicted satellite event; and in the knowledge graph, establish an edge between the first node and another node having an incidence relationship with the first node, and establish an edge between the second node and another node having an incidence relationship with the second node; according to the first node, the second node, the edge connected to the first node, and the edge connected to the second node, update the knowledge graph; extract a meta-path linking the first node and a meta-path linking the second node from the updated knowledge graph; determine, according to each entity in the meta-path linking the first node, a plurality of entities having a related relationship and not connected by an edge with the first node, and construct, according to the determined plurality of entities, a first hyperedge containing the first node; determine, according to each entity in a meta-path linking the second node, a plurality of entities having a related relationship and not connected by an edge with the second node, and construct, according to the determined plurality of entities, a second hyperedge containing the second node; construct, according to the meta-path linking the first node and the first hyperedge, a tree structure with the first node as a root node, and determine, through a feature extraction network in the trained prediction model and the tree structure corresponding to the first node, a target feature of the first node; construct, according to the meta-path linking the second node and the second hyperedge, a tree structure with the second node as a root node, and determine, through a feature extraction network in the trained prediction model and the tree structure corresponding to the second node, a target feature of the second node; and determine, according to the target feature of the first node and the target feature of the second node, an input feature, and input the input feature into a prediction network in the trained prediction model to obtain a predicted incidence relationship between the to-be-predicted satellite entity and the to-be-predicted satellite event entity.

The present disclosure further provides a computer-readable storage medium, where the storage medium stores a computer program, and the computer program may be used to perform the event prediction method based on a satellite orbit threat domain knowledge graph shown in FIG. 1.

Figure 7:
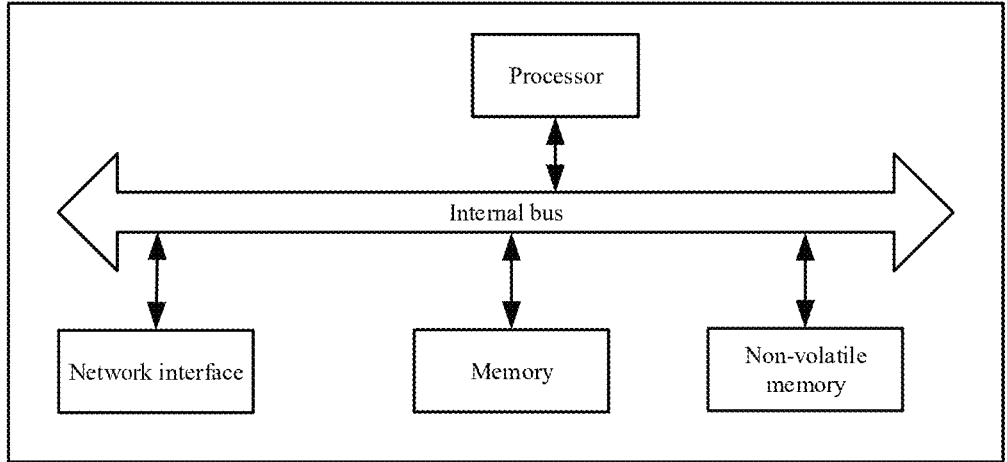
FIG. 7 is an electronic device diagram corresponding to FIG. 1 according to the present disclosure.

The present disclosure further provides a structure diagram of an electronic device shown in FIG. 7. As shown in FIG. 7, at a hardware level, the electronic device includes a processor, an internal bus, a network interface, a memory, and a non-transitory memory, and certainly may further include hardware required by other services. The processor reads a corresponding computer program from the non-transitory memory into the memory and then runs the computer program, to implement the event prediction method based on a satellite orbit threat domain knowledge graph shown in FIG. 1. Certainly, in addition to software implementations, the present disclosure does not exclude other implementations, such as a logic device or a combination of software and hardware, that is, an execution body of the following processing procedure is not limited to each logic unit, and may also be hardware or a logic device.

In the 1990s, whether a technical improvement is a hardware improvement (for example, an improvement to a circuit structure such as a diode, a transistor, or a switch) or a software improvement (an improvement to a method procedure) may be clearly distinguished. However, with the development of technologies, current improvements to many method procedures can be considered as direct improvements to hardware circuit structures. A designer almost obtains a corresponding hardware circuit structure by programming an improved method procedure into a hardware circuit. Therefore, it cannot be said that the improvement of a method flow cannot be achieved with hardware entity modules. For example, a programmable logic device (PLD) (e.g., a field programmable gate array (FPGA)) is such an integrated circuit, and a logic function of the PLD is determined by a user by programming the device. Designers are programmed to "integrate" a digital system on a PLD without needs to ask chip manufacturers to design and fabricate specialized integrated circuit chips. Moreover, today, instead of manually manufacturing an integrated circuit chip, the programming is mostly implemented by a "logic compiler" software, which is similar to the software compiler used during program development and writing, and the original code to be compiled is also written by a specific programming language, which is referred to as a hardware description language (HDL), but HDL is not only one, but many, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and a very high-speed integrated circuit hardware description language (VHDL) and Verilog are most commonly used. It should also be clear to those skilled in the art that the hardware circuit for implementing the logic method flow may be easily obtained by only programming the method flow in the above several hardware description languages as logic programming and programming into the integrated circuit.

The controller may be implemented in any suitable manner, for example, the controller may take the forms of, e.g., a microprocessor or processor, and a computer-readable medium storing computer-readable program code (e.g., software or firmware) executable by the (micro) processor, logic gates, switches, an application specific integrated circuit (ASIC), a programmable logic controller, and an embedded microcontroller, examples of the controller include but are not limited to the following microcontrollers: ARC 625D, Atmel AT91SAM, Microchip PIC18F26K20, and Silicone Labs C8051F320, and the memory controller may further be implemented as part of the control logic of the memory. Those skilled in the art will also appreciate that, in addition to implementing the controller in the form of purely computer-readable program code, it is entirely possible to cause the controller to implement the same functions in the form of logic gates, switches, application specific integrated circuits, programmable logic controllers, embedded microcontrollers, etc., by logically programming the method steps. Therefore, the controller may be considered as a hardware component, and apparatuses included in the controller and configured to implement various functions may also be considered as structures in the hardware component. Alternatively, apparatuses used to implement various functions may even be considered as both software modules implementing the method and structures in the hardware component.

The system, apparatus, module, or unit illustrated in the previous embodiments can be implemented by using a computer chip or an entity, or can be implemented by using a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For case of description, the foregoing apparatus is described separately by dividing a function into various units. Certainly, when the present disclosure is implemented, functions of the units can be implemented in one or more pieces of software and/or hardware.

A person skilled in the art should understand that the embodiments of the present disclosure may be provided as a method, a system, or a computer program product. Therefore, the present specification may take the form of an entirely hardware embodiment, an entirely software embodiment, or an embodiment combining software and hardware aspects. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product according to the embodiments of the present disclosure. It will be understood that each flow and/or block in the flowcharts and/or block diagrams, and combinations of flows and/or blocks in the flowcharts and/or block diagrams, can be implemented by computer program instructions. These computer program instructions may be provided to a general-purpose computer, a special-purpose computer, an embedded processor, or a processor of another programmable data processing device to generate a machine, so that the instructions executed by the computer or the processor of the another programmable data processing device generate an apparatus for implementing a function specified in one or more procedures in the flowcharts and/or one or more blocks in the block diagrams.

These computer program instructions may also be stored in a computer-readable memory that can guide a computer or another programmable data processing device to work in a specific manner, so that the instructions stored in the computer-readable memory generate a product including an instruction apparatus, and the instruction apparatus implements a function specified in one or more processes in the flowcharts and/or one or more blocks in the block diagrams.

These computer program instructions may also be loaded onto a computer or other programmable data processing device to cause a series of operational steps to be performed on the computer or other programmable device to produce computer-implemented processing, such that the instructions executed on the computer or other programmable device provide steps for implementing the functions specified in one or more flows of the flowcharts and/or one or more blocks of the block diagrams.

In a typical configuration, a computing device includes one or more processors (CPUs), an input/output interface, a network interface, and a memory.

The memory may include a form such as a volatile memory, a random access memory (RAM), and/or a non-transitory memory in a computer-readable medium, e.g., a read-only memory (ROM) or a flash RAM. Memory is an example of computer-readable media.

Computer readable media includes both permanent and non-permanent, removable and non-removable media capable of storing information by any method or technology. The information may be computer-readable instructions, data structures, modules of a program, or other data. Examples of computer storage media include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, which can be used to store information that can be accessed by a computing device. As defined herein, the computer-readable medium does not include transitory media, such as modulated data signals and carrier waves.

It should also be noted that the terms "include", "comprise" or any other variations thereof are intended to cover non-exclusive inclusion, so that a process, method, product or device including a series of elements includes not only those elements, but also other elements not explicitly listed, or elements inherent to such a process, method, product or device. An element proceeded by "comprises a . . . " does not, without more constraints, preclude the existence of additional identical elements in the process, method, article, or device that comprises the element.

A person skilled in the art should understand that the embodiments of the present disclosure may be provided as a method, a system, or a computer program product. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, and the like) that include computer-usable program code.

The present disclosure can be described in the general context of computer-executable instructions executed by a computer, e.g., a program module. Generally, program modules include routines, programs, objects, components, data structures, etc. that perform particular tasks or implement particular abstract data types. The present disclosure may also be practiced in distributed computing environments where tasks are performed by remote processing devices that are linked through a communications network. In a distributed computing environment, program modules may be located in both local and remote computer storage media including memory storage devices.

The embodiments in the present disclosure are all described in a progressive manner, for same or similar parts in the embodiments, refer to each other, and each embodiment focuses on a difference from other embodiments. Especially, the system embodiments are basically similar to the method embodiments, and therefore are described briefly, and for related parts, refer to partial descriptions in the method embodiments.

The foregoing descriptions are merely embodiments of the present disclosure, and are not intended to limit the present disclosure. For those skilled in the art, the present disclosure may have various modifications and variations. Any modification, equivalent replacement, or improvement made without departing from the spirit and principle of the present disclosure shall fall within the scope of the claims of the present disclosure.

What is claimed is:

1. An event prediction method based on a satellite orbit threat domain knowledge graph, comprising:

acquiring a database of a satellite orbit threat domain; by respectively using entities stored in the database as nodes and using an incidence relationship between each entity as an edge, constructing a knowledge graph of the satellite orbit threat domain; wherein the entities comprise a satellite, a satellite event, and a motion orbit, and the incidence relationship comprises an event category and a motion state;

extracting meta-paths from the knowledge graph; and for each of the meta-paths, determining, according to each entity linked by each edge contained in the meta-path, a meta-path having a same starting entity and/or a same ending entity as the meta-path from the meta-paths as a reference meta-path corresponding to the meta-path; determining, according to each entity linked by each edge contained in the meta-path and each entity linked by each edge contained in the reference meta-path corresponding to the meta-path, a plurality of entities having a related relationship and not connected by an edge; and constructing, according to the determined plurality of entities, a hyperedge;

determining an entity feature corresponding to each entity through a feature extraction network in a to-be-trained prediction model;

for each entity, constructing, according to respective entities that are linked by respective edges contained in a meta-path that an edge connected to the entity belongs to and respective entities contained in the hyperedge that the entity belongs to, a target tree structure with the entity as a root node, and aggregating entity features of respective entities contained in the target tree structure corresponding to the entity to determine a target feature of the entity;

forming, according to any one satellite entity and any one satellite event entity in the entities, an entity-pair; determining, for each entity-pair, at least according to a target feature of a satellite entity in the entity-pair and a target feature of a satellite event entity in the entity-pair, an input feature of the entity-pair; obtaining, by inputting the input feature of the entity-pair into a prediction network in a to-be-trained prediction model, a predicted incidence relationship between the satellite entity and the satellite event entity in the entity-pair; and training, according to a difference between the incidence relationship between the satellite entity and the satellite event entity in the entity-pair in the knowledge graph and the predicted incidence relationship, the to-be-trained prediction model; and in response to a prediction request, determining a predicted incidence relationship between a to-be-predicted dicted incidence relationship between a to-be-predicted satellite and a to-be-predicted satellite event through the trained prediction model;

wherein a predicted incidence relationship between the satellite entity and a satellite event entity output by the prediction network is represented by a predicted probability that the incidence relationship exists between the satellite entity and the satellite event entity; and training, according to a difference between the incidence relationship between the satellite entity and the satellite event entity in the entity-pair in the knowledge graph and the predicted incidence relationship, the to-be-trained prediction model comprises:

according to the incidence relationship between the satellite entity and the satellite event entity in the entity-pair in the knowledge graph, using an entity-pair with an edge between the satellite entity and the satellite event entity as a positive sample pair, and using an entity-pair with no edge between the satellite entity and the satellite event entity as a negative sample pair;

determining, according to a first predicted probability of an incidence relationship existence between a satellite entity and a satellite event entity in the positive sample pair and a second predicted probability of an incidence relationship existence between a satellite entity and a satellite event entity in the negative sample pair, a loss function; wherein the loss function is inversely proportional to the first predicted probability, and the loss function is directly proportional to the second predicted probability; and training the to-be-trained prediction model with minimization of the loss function as a training goal.

2. The method according to claim 1, wherein determining, according to each entity linked by each edge contained in the meta-path and each entity linked by each edge contained in the reference meta-path corresponding to the meta-path, the plurality of entities having the related relationship and not connected by the edge comprises:

determining an incidence relationship type corresponding to each edge contained in the meta-path;

determining an incidence relationship type corresponding to each edge contained in the reference meta-path corresponding to the meta-path;

by using an intersection entity between the meta-path and a reference meta-path of the meta-path as a starting point, sequentially determining whether the incidence relationship type corresponding to each edge contained in the meta-path is same as the incidence relationship type corresponding to each edge contained in the reference meta-path corresponding to the meta-path, and obtaining a determination result between each edge contained in the meta-path and each edge contained in the reference meta-path corresponding to the meta-path, until the determination result indicates that the incidence relationship types are different or edges contained in the meta-path are traversed; and determining, an entity linked by an edge contained in the meta-path and an entity linked by an edge contained in the reference meta-path corresponding to the meta-path, that have a determination result that the incidence relationship types are the same, as the plurality of entities having the related relationship and not connected by the edge.

3. The method according to claim 1, wherein determining the entity feature corresponding to each entity through the feature extraction network in the to-be-trained prediction model comprises:

for each entity, obtaining, by inputting the entity into the feature extraction network in the to-be-trained prediction model, an initialization feature of an entity output by the feature extraction network;

determining, according to the initialization feature of the entity and the initialization features of respective entities contained in the hyperedge that the entity belongs to, a weight corresponding to the entity through an attention network in the to-be-trained prediction model; and obtaining, by weighting the initialization feature of the entity with the weight corresponding to the entity, the entity feature corresponding to the entity.

4. The method according to claim 1, wherein constructing, according to respective entities that are linked by respective edges contained in a meta-path that an edge connected to the entity belongs to and respective entities contained in the hyperedge that the entity belongs to, a target tree structure with the entity as a root node comprises:

using the entity as the root node, and using other entities, other than the entity, contained in the hyperedge that the entity belongs to as respective first child nodes of the root node;

determining, among each entity that is linked by each edge contained in a meta-path that an edge connected to the entity belongs to, entities that are directly connected to the entity through edges as second child nodes of the root node; and for each second child node, using the second child node as a current child node; determining, according to an edge linking the current child node in a meta-path that an edge connected to the entity belongs to, next-level child nodes corresponding to the current child node; for each next-level child node, by using the next-level child node as a current child node, re-determining next-level child nodes corresponding to the current child node, until entities that are linked by edges contained in the meta-path that the edge connected to the entity belongs to are traversed; and obtaining the target tree structure corresponding to the entity, with the entity as the root node, containing the first child nodes, the second child nodes, and respective levels of child nodes corresponding to each second child node.

5. The method according to claim 4, wherein aggregating entity features of respective entities contained in the target tree structure corresponding to the entity to determine the target feature of the entity comprises:

by using each parent node directly connected to each leaf node in the target tree structure corresponding to the entity as a starting point of a feature aggregation, sequentially determining each current to-be-aggregated node;

for each current to-be-aggregated node, in the target tree structure corresponding to the entity, determining each child node directly connected to the current to-be-aggregated node, and acquiring a current feature of each child node directly connected to the current to-be-aggregated node obtained by a previous feature aggregation;

obtaining, by aggregating the current feature corresponding to each child node directly connected to the current to-be-aggregated node and an entity feature of the current to-be-aggregated node through a gated recurrent unit, a current feature of the current to-be-aggregated node;

by using a parent node directly connected to each current to-be-aggregated node as a current to-be-aggregated node for a next feature aggregation, re-performing a feature aggregation, until obtaining a current feature of the root node in the target tree structure corresponding to the entity; and using the current feature of the root node in the target tree structure corresponding to the entity as the target feature of the entity;

wherein, in response to determining that each child node directly connected to the current to-be-aggregated node is a leaf node in the target tree structure corresponding to the entity, a current feature of each child node directly connected to the current to-be-aggregated node is an entity feature of each child node directly connected to the current to-be-aggregated node.

6. The method according to claim 1, wherein determining, for each entity-pair, at least according to the target feature of the satellite entity in the entity-pair and the target feature of the satellite event entity in the entity-pair, the input feature of the entity-pair comprises:

for each entity-pair, in the knowledge graph, in response to determining that the satellite entity in the entity-pair and the satellite event entity in the entity-pair are connected by an edge, determining, according to the entity feature of the satellite entity in the entity-pair and the entity feature of the satellite event entity in the entity-pair, a first gating weight and a second gating weight through a self-gating layer in the to-be-trained prediction model;

weighting the entity feature of the satellite entity in the entity-pair with the first gating weight, weighting the entity feature of the satellite event entity in the entity-pair with the second gating weight, and determining, according to a weighted entity feature of the satellite entity and a weighted entity feature of the satellite event entity, an edge feature corresponding to the edge between the satellite entity in the entity-pair and the satellite event entity in the entity-pair; and obtaining, by splicing the target feature of the satellite entity in the entity-pair, the target feature of the satellite event entity in the entity-pair, and the edge feature corresponding to the edge between the satellite entity in the entity-pair and the satellite event entity in the entity-pair, the input feature of the entity-pair.

7. The method according to claim 1, wherein determining the predicted incidence relationship between the to-be-predicted satellite and the to-be-predicted satellite event through the trained prediction model comprises:

obtaining attribute information of the to-be-predicted satellite and attribute information of the to-be-predicted satellite event; determining, according to the attribute information of the to-be-predicted satellite and the attribute information of the to-be-predicted satellite event, in the knowledge graph, a first node corresponding to the to-be-predicted satellite and a second node corresponding to the to-be-predicted satellite event; and in the knowledge graph, establishing an edge between the first node and another node having an incidence relationship with the first node, and establishing an edge between the second node and another node having an incidence relationship with the second node; and according to the first node, the second node, the edge connected to the first node, and the edge connected to the second node, updating the knowledge graph;

extracting a meta-path linking the first node and a meta-path linking the second node from the updated knowledge graph;

determining, according to each entity in the meta-path linking the first node, a plurality of entities having a related relationship and not connected by an edge with the first node, and constructing, according to the determined plurality of entities, a first hyperedge containing the first node;

determining, according to each entity in the meta-path linking the second node, a plurality of entities having a related relationship and not connected by an edge with the second node, and constructing, according to the determined plurality of entities, a second hyperedge containing the second node;

constructing, according to the meta-path linking the first node and the first hyperedge, a tree structure with the first node as a root node, and determining, through a feature extraction network in the trained prediction model and the tree structure corresponding to the first node, a target feature of the first node;

constructing, according to the meta-path linking the second node and the second hyperedge, a tree structure with the second node as a root node, and determining, through a feature extraction network in the trained prediction model and the tree structure corresponding to the second node, a target feature of the second node; and determining, according to the target feature of the first node and the target feature of the second node, an input feature, and inputting the input feature into a prediction network in the trained prediction model to obtain a predicted incidence relationship between a to-be-predicted satellite entity and a to-be-predicted satellite event entity.

8. A non-transitory computer-readable storage medium, wherein the storage medium stores a computer program, and the computer program, when executed by one or more processors, implements operations comprising:

acquiring a database of a satellite orbit threat domain; by respectively using entities stored in the database as nodes and using an incidence relationship between each entity as an edge, constructing a knowledge graph of the satellite orbit threat domain; wherein the entities comprise a satellite, a satellite event, and a motion orbit, and the incidence relationship comprises an event category and a motion state;

extracting meta-paths from the knowledge graph; and for each of the meta-paths, determining, according to each entity linked by each edge contained in the meta-path, a meta-path having a same starting entity and/or a same ending entity as the meta-path from the meta-paths as a reference meta-path corresponding to the meta-path; determining, according to each entity linked by each edge contained in the meta-path and each entity linked by each edge contained in the reference meta-path corresponding to the meta-path, a plurality of entities having a related relationship and not connected by an edge; and constructing, according to the determined plurality of entities, a hyperedge;

determining an entity feature corresponding to each entity through a feature extraction network in a to-be-trained prediction model;

for each entity, constructing, according to respective entities that are linked by respective edges contained in a meta-path that an edge connected to the entity belongs to and respective entities contained in the hyperedge that the entity belongs to, a target tree structure with the entity as a root node, and aggregating entity features of respective entities contained in the target tree structure corresponding to the entity to determine a target feature of the entity;

forming, according to any one satellite entity and any one satellite event entity in the entities, an entity-pair; determining, for each entity-pair, at least according to a target feature of a satellite entity in the entity-pair and a target feature of a satellite event entity in the entity-pair, an input feature of the entity-pair; obtaining, by inputting the input feature of the entity-pair into a prediction network in a to-be-trained prediction model, a predicted incidence relationship between the satellite entity and the satellite event entity in the entity-pair; and training, according to a difference between the incidence relationship between the satellite entity and the satellite event entity in the entity-pair in the knowledge graph and the predicted incidence relationship, the to-be-trained prediction model; and in response to a prediction request, determining a predicted incidence relationship between a to-be-predicted satellite and a to-be-predicted satellite event through the trained prediction model;

wherein a predicted incidence relationship between the satellite entity and a satellite event entity output by the prediction network is represented by a predicted probability that the incidence relationship exists between the satellite entity and the satellite event entity; and training, according to a difference between the incidence relationship between the satellite entity and the satellite event entity in the entity-pair in the knowledge graph and the predicted incidence relationship, the to-be-trained prediction model comprises:

according to the incidence relationship between the satellite entity and the satellite event entity in the entity-pair in the knowledge graph, using an entity-pair with an edge between the satellite entity and the satellite event entity as a positive sample pair, and using an entity-pair with no edge between the satellite entity and the satellite event entity as a negative sample pair;

determining, according to a first predicted probability of an incidence relationship existence between a satellite entity and a satellite event entity in the positive sample pair and a second predicted probability of an incidence relationship existence between a satellite entity and a satellite event entity in the negative sample pair, a loss function; wherein the loss function is inversely proportional to the first predicted probability, and the loss function is directly proportional to the second predicted probability; and training the to-be-trained prediction model with minimization of the loss function as a training goal.

9. The storage medium according to claim 8, wherein determining, according to each entity linked by each edge contained in the meta-path and each entity linked by each edge contained in the reference meta-path corresponding to the meta-path, the plurality of entities having the related relationship and not connected by the edge comprises:

determining an incidence relationship type corresponding to each edge contained in the meta-path;

determining an incidence relationship type corresponding to each edge contained in the reference meta-path corresponding to the meta-path;

by using an intersection entity between the meta-path and a reference meta-path of the meta-path as a starting point, sequentially determining whether the incidence relationship type corresponding to each edge contained in the meta-path is same as the incidence relationship type corresponding to each edge contained in the reference meta-path corresponding to the meta-path, and obtaining a determination result between each edge contained in the meta-path and each edge contained in the reference meta-path corresponding to the meta-path, until the determination result indicates that the incidence relationship types are different or edges contained in the meta-path are traversed; and determining, an entity linked by an edge contained in the meta-path and an entity linked by an edge contained in the reference meta-path corresponding to the meta-path, that have a determination result that the incidence relationship types are the same, as the plurality of entities having the related relationship and not connected by the edge.

10. The storage medium according to claim 8, wherein determining the entity feature corresponding to each entity through the feature extraction network in the to-be-trained prediction model comprises:

for each entity, obtaining, by inputting the entity into the feature extraction network in the to-be-trained prediction model, an initialization feature of an entity output by the feature extraction network;

determining, according to the initialization feature of the entity and the initialization features of respective entities contained in the hyperedge that the entity belongs to, a weight corresponding to the entity through an attention network in the to-be-trained prediction model; and obtaining, by weighting the initialization feature of the entity with the weight corresponding to the entity, the entity feature corresponding to the entity.

11. The storage medium according to claim 8, wherein constructing, according to respective entities that are linked by respective edges contained in a meta-path that an edge connected to the entity belongs to and respective entities contained in the hyperedge that the entity belongs to, a target tree structure with the entity as a root node comprises:

using the entity as the root node, and using other entities, other than the entity, contained in the hyperedge that the entity belongs to as respective first child nodes of the root node;

determining, among each entity that is linked by each edge contained in a meta-path that an edge connected to the entity belongs to, entities that are directly connected to the entity through edges as second child nodes of the root node; and for each second child node, using the second child node as a current child node; determining, according to an edge linking the current child node in a meta-path that an edge connected to the entity belongs to, next-level child nodes corresponding to the current child node; for each next-level child node, by using the next-level child node as a current child node, re-determining next-level child nodes corresponding to the current child node, until entities that are linked by edges contained in the meta-path that the edge connected to the entity belongs to are traversed; and obtaining the target tree structure corresponding to the entity, with the entity as the root node, containing the first child nodes, the second child nodes, and respective levels of child nodes corresponding to each second child node.

12. The storage medium according to claim 11, wherein aggregating entity features of respective entities contained in the target tree structure corresponding to the entity to determine the target feature of the entity comprises:

by using each parent node directly connected to each leaf node in the target tree structure corresponding to the entity as a starting point of a feature aggregation, sequentially determining each current to-be-aggregated node;

for each current to-be-aggregated node, in the target tree structure corresponding to the entity, determining each child node directly connected to the current to-be-aggregated node, and acquiring a current feature of each child node directly connected to the current to-be-aggregated node obtained by a previous feature aggregation;

obtaining, by aggregating the current feature corresponding to each child node directly connected to the current to-be-aggregated node and an entity feature of the current to-be-aggregated node through a gated recurrent unit, a current feature of the current to-be-aggregated node;

by using a parent node directly connected to each current to-be-aggregated node as a current to-be-aggregated node for a next feature aggregation, re-performing a feature aggregation, until obtaining a current feature of the root node in the target tree structure corresponding to the entity; and using the current feature of the root node in the target tree structure corresponding to the entity as the target feature of the entity;

wherein, in response to determining that each child node directly connected to the current to-be-aggregated node is a leaf node in the target tree structure corresponding to the entity, a current feature of each child node directly connected to the current to-be-aggregated node is an entity feature of each child node directly connected to the current to-be-aggregated node.

13. The storage medium according to claim 8, wherein determining, for each entity-pair, at least according to the target feature of the satellite entity in the entity-pair and the target feature of the satellite event entity in the entity-pair, the input feature of the entity-pair comprises:

for each entity-pair, in the knowledge graph, in response to determining that the satellite entity in the entity-pair and the satellite event entity in the entity-pair are connected by an edge, determining, according to the entity feature of the satellite entity in the entity-pair and the entity feature of the satellite event entity in the entity-pair, a first gating weight and a second gating weight through a self-gating layer in the to-be-trained prediction model;

weighting the entity feature of the satellite entity in the entity-pair with the first gating weight, weighting the entity feature of the satellite event entity in the entity-pair with the second gating weight, and determining, according to a weighted entity feature of the satellite entity and a weighted entity feature of the satellite event entity, an edge feature corresponding to the edge between the satellite entity in the entity-pair and the satellite event entity in the entity-pair; and obtaining, by splicing the target feature of the satellite entity in the entity-pair, the target feature of the satellite event entity in the entity-pair, and the edge feature corresponding to the edge between the satellite entity in the entity-pair and the satellite event entity in the entity-pair, the input feature of the entity-pair.

14. The storage medium according to claim 8, wherein determining the predicted incidence relationship between the to-be-predicted satellite and the to-be-predicted satellite event through the trained prediction model comprises:

obtaining attribute information of the to-be-predicted satellite and attribute information of the to-be-predicted satellite event; determining, according to the attribute information of the to-be-predicted satellite and the attribute information of the to-be-predicted satellite event, in the knowledge graph, a first node corresponding to the to-be-predicted satellite and a second node corresponding to the to-be-predicted satellite event; and in the knowledge graph, establishing an edge between the first node and another node having an incidence relationship with the first node, and establishing an edge between the second node and another node having an incidence relationship with the second node; and according to the first node, the second node, the edge connected to the first node, and the edge connected to the second node, updating the knowledge graph;

extracting a meta-path linking the first node and a meta-path linking the second node from the updated knowledge graph;

determining, according to each entity in the meta-path linking the first node, a plurality of entities having a related relationship and not connected by an edge with the first node, and constructing, according to the determined plurality of entities, a first hyperedge containing the first node;

determining, according to each entity in the meta-path linking the second node, a plurality of entities having a related relationship and not connected by an edge with the second node, and constructing, according to the determined plurality of entities, a second hyperedge containing the second node;

constructing, according to the meta-path linking the first node and the first hyperedge, a tree structure with the first node as a root node, and determining, through a feature extraction network in the trained prediction model and the tree structure corresponding to the first node, a target feature of the first node;

constructing, according to the meta-path linking the second node and the second hyperedge, a tree structure with the second node as a root node, and determining, through a feature extraction network in the trained prediction model and the tree structure corresponding to the second node, a target feature of the second node; and determining, according to the target feature of the first node and the target feature of the second node, an input feature, and inputting the input feature into a prediction network in the trained prediction model to obtain a predicted incidence relationship between a to-be-predicted satellite entity and a to-be-predicted satellite event entity.

15. An electronic device, comprising a memory, one or more processors, and a computer program stored in the memory and executable on the one or more processors, wherein the one or more processors, when executing the program, implement operations comprising:

acquiring a database of a satellite orbit threat domain; by respectively using entities stored in the database as nodes and using an incidence relationship between each entity as an edge, constructing a knowledge graph of the satellite orbit threat domain; wherein the entities comprise a satellite, a satellite event, and a motion orbit, and the incidence relationship comprises an event category and a motion state;

extracting meta-paths from the knowledge graph; and for each of the meta-paths, determining, according to each entity linked by each edge contained in the meta-path, a meta-path having a same starting entity and/or a same ending entity as the meta-path from the meta-paths as a reference meta-path corresponding to the meta-path; determining, according to each entity linked by each edge contained in the meta-path and each entity linked by each edge contained in the reference meta-path corresponding to the meta-path, a plurality of entities having a related relationship and not connected by an edge; and constructing, according to the determined plurality of entities, a hyperedge;

determining an entity feature corresponding to each entity through a feature extraction network in a to-be-trained prediction model;

for each entity, constructing, according to respective entities that are linked by respective edges contained in a meta-path that an edge connected to the entity belongs to and respective entities contained in the hyperedge that the entity belongs to, a target tree structure with the entity as a root node, and aggregating entity features of respective entities contained in the target tree structure corresponding to the entity to determine a target feature of the entity;

forming, according to any one satellite entity and any one satellite event entity in the entities, an entity-pair; determining, for each entity-pair, at least according to a target feature of a satellite entity in the entity-pair and a target feature of a satellite event entity in the entity-pair, an input feature of the entity-pair; obtaining, by inputting the input feature of the entity-pair into a prediction network in a to-be-trained prediction model, a predicted incidence relationship between the satellite entity and the satellite event entity in the entity-pair; and training, according to a difference between the incidence relationship between the satellite entity and the satellite event entity in the entity-pair in the knowledge graph and the predicted incidence relationship, the to-be-trained prediction model; and in response to a prediction request, determining a predicted incidence relationship between a to-be-predicted satellite and a to-be-predicted satellite event through the trained prediction model;

wherein a predicted incidence relationship between the satellite entity and a satellite event entity output by the prediction network is represented by a predicted probability that the incidence relationship exists between the satellite entity and the satellite event entity; and training, according to a difference between the incidence relationship between the satellite entity and the satellite event entity in the entity-pair in the knowledge graph and the predicted incidence relationship, the to-be-trained prediction model comprises:

according to the incidence relationship between the satellite entity and the satellite event entity in the entity-pair in the knowledge graph, using an entity-pair with an edge between the satellite entity and the satellite event entity as a positive sample pair, and using an entity-pair with no edge between the satellite entity and the satellite event entity as a negative sample pair;

determining, according to a first predicted probability of an incidence relationship existence between a satellite entity and a satellite event entity in the positive sample pair and a second predicted probability of an incidence relationship existence between a satellite entity and a satellite event entity in the negative sample pair, a loss function; wherein the loss function is inversely proportional to the first predicted probability, and the loss function is directly proportional to the second predicted probability; and training the to-be-trained prediction model with minimization of the loss function as a training goal.

16. The electronic device according to claim 15, wherein determining, according to each entity linked by each edge contained in the meta-path and each entity linked by each edge contained in the reference meta-path corresponding to the meta-path, the plurality of entities having the related relationship and not connected by the edge comprises:

determining an incidence relationship type corresponding to each edge contained in the meta-path;

determining an incidence relationship type corresponding to each edge contained in the reference meta-path corresponding to the meta-path;

by using an intersection entity between the meta-path and a reference meta-path of the meta-path as a starting point, sequentially determining whether the incidence relationship type corresponding to each edge contained in the meta-path is same as the incidence relationship type corresponding to each edge contained in the reference meta-path corresponding to the meta-path, and obtaining a determination result between each edge contained in the meta-path and each edge contained in the reference meta-path corresponding to the meta-path, until the determination result indicates that the incidence relationship types are different or edges contained in the meta-path are traversed; and determining, an entity linked by an edge contained in the meta-path and an entity linked by an edge contained in the reference meta-path corresponding to the meta-path, that have a determination result that the incidence relationship types are the same, as the plurality of entities having the related relationship and not connected by the edge.

17. The electronic device according to claim 15, wherein determining the entity feature corresponding to each entity through the feature extraction network in the to-be-trained prediction model comprises:

for each entity, obtaining, by inputting the entity into the feature extraction network in the to-be-trained prediction model, an initialization feature of an entity output by the feature extraction network;

determining, according to the initialization feature of the entity and the initialization features of respective entities contained in the hyperedge that the entity belongs to, a weight corresponding to the entity through an attention network in the to-be-trained prediction model; and obtaining, by weighting the initialization feature of the entity with the weight corresponding to the entity, the entity feature corresponding to the entity.

18. The electronic device according to claim 15, wherein constructing, according to respective entities that are linked by respective edges contained in a meta-path that an edge connected to the entity belongs to and respective entities contained in the hyperedge that the entity belongs to, a target tree structure with the entity as a root node comprises:

using the entity as the root node, and using other entities, other than the entity, contained in the hyperedge that the entity belongs to as respective first child nodes of the root node;

determining, among each entity that is linked by each edge contained in a meta-path that an edge connected to the entity belongs to, entities that are directly connected to the entity through edges as second child nodes of the root node; and for each second child node, using the second child node as a current child node; determining, according to an edge linking the current child node in a meta-path that an edge connected to the entity belongs to, next-level child nodes corresponding to the current child node; for each next-level child node, by using the next-level child node as a current child node, re-determining next-level child nodes corresponding to the current child node, until entities that are linked by edges contained in the meta-path that the edge connected to the entity belongs to are traversed; and obtaining the target tree structure corresponding to the entity, with the entity as the root node, containing the first child nodes, the second child nodes, and respective levels of child nodes corresponding to each second child node.

* * * * *